(12) United States Patent
Ratti

(10) Patent No.: US 9,143,769 B2
(45) Date of Patent: Sep. 22, 2015

(54) 3-D LUMINOUS PIXEL ARRAYS, 3-D LUMINOUS PIXEL ARRAY CONTROL SYSTEMS AND METHODS OF CONTROLLING 3-D LUMINOUS PIXEL ARRAYS

(75) Inventor: Carlo Ratti, Turin (IT)

(73) Assignee: Massachusetts Institute of Technology, Cambridge, MA (US)

( * ) Notice: Subject to any disclaimer, the term of this patent is extended or adjusted under 35 U.S.C. 154(b) by 362 days.

(21) Appl. No.: 13/171,881

(22) Filed: Jun. 29, 2011

(65) Prior Publication Data

US 2013/0002855 A1    Jan. 3, 2013

(51) Int. Cl.
*H04N 7/18*     (2006.01)
*H04N 13/04*    (2006.01)

(52) U.S. Cl.
CPC .................... *H04N 13/0488* (2013.01)

(58) Field of Classification Search
USPC ........................................................ 348/117
See application file for complete search history.

(56) References Cited

U.S. PATENT DOCUMENTS

| | | |
|---|---|---|
| 2008/0074346 A1 | 3/2008 | Petrich et al. |
| 2008/0125896 A1 | 5/2008 | Troy et al. |
| 2008/0313937 A1 | 12/2008 | Boyce |
| 2010/0079598 A1* | 4/2010 | Ke et al. .............. 348/187 |
| 2010/0123415 A1 | 5/2010 | Webb |
| 2010/0228418 A1* | 9/2010 | Whitlow et al. ........... 701/25 |
| 2011/0108672 A1* | 5/2011 | Shmilovich et al. ...... 244/207 |
| 2011/0128372 A1* | 6/2011 | Malecki et al. .......... 348/135 |

OTHER PUBLICATIONS

International Search Report and Written Opinion issued in related PCT Patent Application PCT/US2011/042297, dated Jan. 19, 2012, 12 pages.

* cited by examiner

*Primary Examiner* — Dave Czekaj
*Assistant Examiner* — Leron Beck
(74) *Attorney, Agent, or Firm* — Sam Pasternack; MIT Technology Licensing Office

(57) ABSTRACT

Luminous pixel array. Each pixel in the array is formed by a luminous flying vehicle. A plurality of luminous flying vehicles are controlled to move in three-dimensional space so as to crate two-dimensional and three-dimensional shapes that can move in space. In one embodiment images are formed.

20 Claims, 14 Drawing Sheets

3-D LUMINOUS PIXEL ARRAYS, 3-D LUMINOUS PIXEL ARRAY CONTROL SYSTEMS AND METHODS OF CONTROLLING 3-D LUMINOUS PIXEL ARRAYS

TECHNICAL FIELD

The present inventive concepts generally relate to systems and methods for displaying 3-dimensional arrays of pixels, and more particularly, to 3-dimensional luminous pixel arrays, 3-dimensional luminous pixel array control systems and methods of controlling 3-dimensional luminous pixel arrays.

BACKGROUND

In general, 3-dimensional display devices comprise membranes or films that project an illusion of depth in a photograph, movie or other 2-dimensional image. A 3-dimensional illusion can be projected to a viewer by displaying two 2-dimensional images, which represent two perspectives of the same photograph, movie or image. However, such 3-dimensional display devices generally require viewers to wear specialized eyeglasses.

On the other hand, some 3-dimensional projection devices, such as swept-volume displays, comprise a plurality of image projectors that project images on a display surface undergoing rotational motion. As the display surface rotates, the images projected on the 2-dimensional display surface changes, which creates a 3-dimensional illusion. However, such 3-dimensional projection devices have limited viewing angles.

SUMMARY

The present inventive concepts generally relate to systems and methods for displaying 3-dimensional arrays of pixels, and more particularly, to 3-dimensional luminous pixel arrays, 3-dimensional luminous pixel array control systems and methods of controlling 3-dimensional luminous pixel arrays. In particular, embodiments described herein provide systems and methods for displaying and controlling 3-dimensional luminous pixel arrays that include a plurality of pixels, such as "flying pixels" or luminous flying vehicles, which move in 2-dimensional and 3-dimensional space. Each flying pixel or luminous flying vehicle can be configured and/or controlled to move in 2-dimensional and/or 3-dimensional space, e.g., Cartesian coordinates, polar coordinates, celestial coordinates, ecliptic coordinates, geographic coordinates, etc., and can be configured and/or controlled to change its color and light intensity so as to create and/or render 2-dimensional and 3-dimensional images and shapes that can move in space.

Further, embodiments described herein provide systems and methods for displaying and controlling 2-dimensional and 3-dimensional image-creating events. For example, a plurality of flying pixels or luminous flying vehicles can be configured and/or controlled to execute synchronized motions in space to form a luminous display surface or canvas comprising a plurality of pixels. As such, the plurality of flying pixels or luminous flying devices can be arranged in space to form various 2-dimensional and 3-dimensional images and shapes. In addition, unlike conventional 2-dimensional and 3-dimensional display devices that can only be viewed from a few directions, the systems and methods described herein can be viewed from all directions.

In one aspect, a luminous pixel array, comprises: a plurality of luminous flying vehicles configured to move in 3-dimensional space, wherein a first luminous flying vehicle of the plurality of luminous flying vehicles corresponds to at least one pixel of the luminous pixel array, and wherein the first luminous flying vehicle is configured to radiate a first color and intensity of light.

The at least one pixel of the luminous pixel array may include a first pixel. The at least one pixel of the luminous pixel array may further include a second pixel. Each one of the plurality of luminous flying vehicles may correspond to a pixel of the luminous pixel array. Each one of the plurality of luminous flying vehicles may correspond to one or more pixels of the luminous pixel array.

The first luminous flying vehicle may include at least one luminous element constructed and arranged to radiate the first color and intensity of light. The at least one luminous element may include an RGB light emitting diode. The at least one luminous element may include a red light emitting diode, a green light emitting diode and a blue light emitting diode. The at least one luminous element may include one selected from the group consisting of: an electron stimulated device, an incandescent lamp device, an electroluminescent lamp device, a gas discharge lamp device, and a-high-intensity discharge lamp device. The at least one luminous element may include an electronic display device.

A second luminous flying vehicle of the plurality of luminous flying vehicles may correspond to at least one other pixel of the luminous pixel array. The second luminous flying vehicle may include at least one luminous element constructed and arranged to radiate a second color and intensity of light. The at least one luminous element may include at least one light emitting diode. The at least one light emitting diode may include at least one phosphor-type light emitting diode or at least one organic light emitting diode.

The plurality of luminous flying vehicles may further be configured to move in 3-dimensional space so as to create 2-dimensional and 3-dimensional shapes that can move in space. A color and intensity of light may be radiated by each of the plurality of luminous flying vehicles so as to render 2-dimensional and 3-dimensional images.

The plurality of luminous flying vehicles may include second through twenty-fifth luminous flying vehicles. The plurality of luminous flying vehicles may include second through fiftieth luminous flying vehicles. The plurality of luminous flying vehicles may include second through one-hundredth luminous flying vehicles. The plurality of luminous flying vehicles may include second through one-thousandth luminous flying vehicles. The plurality of luminous flying vehicles may include second through two-thousandth luminous flying vehicles. The plurality of luminous flying vehicles may include second through five-thousandth luminous flying vehicles.

The plurality of luminous flying vehicles may include at least two rotary-wing luminous flying vehicles. The plurality of luminous flying vehicles may include at least two fixed-wing luminous flying vehicles. The plurality of luminous flying vehicles may include at least two aerostat luminous flying vehicles.

The first luminous flying vehicle may be configured to radiate the first color and intensity of light for a first predetermined length of time, and may be further configured to radiate a second color and intensity of light for a second predetermined length of time.

The first luminous flying vehicle may include an optical identification element that emits radiation in a non-visible spectrum. The optical identification element may include an infrared light emitting diode and/or a reflector. Each luminous flying vehicle of the plurality of luminous flying vehicles may include an optical identification element. The optical identification element may be constructed and arranged to emit radiation in a non-visible spectrum.

The first luminous flying vehicle may include at least one luminous element positioned on an outer surface of the first luminous flying vehicle. The at least one luminous element may be positioned on the outer surface of a body of the luminous flying vehicle. The at least one luminous element may be positioned on the outer surface of a gas chamber of the luminous flying device. The first luminous flying vehicle may include at least one luminous element positioned within a body of the first luminous flying vehicle. The at least one luminous element may be positioned within a central portion of the body. The body of the first luminous flying vehicle may be translucent or opaque.

The first luminous flying vehicle may include a vehicle control system comprising: a micro-processing system; positioning and localization systems electrically connected to the micro-processing system; at least one luminous element electrically connected to the micro-processing system; a wireless transceiver connected to the micro-processing system; and a power source constructed and arranged to provide a current to the micro-processing system, the positioning and localization systems, the at least one luminous element and the wireless transceiver. The micro-processing system may be configured to control a flight trajectory of the first luminous flying vehicle. The micro-processing system may be further configured to control a color and light intensity of the at least one luminous element. The micro-processing system may be further configured to alter the flight trajectory of the first luminous flying vehicle in response to control commands received from a ground-based control system. The micro-processing system may be further configured to alter the flight trajectory of the first luminous flying vehicle in response to a predetermined flight trajectory stored in memory of the vehicle control system.

The positioning and localization systems may include a navigation positioning system receiver configured to determine a position of the first luminous flying vehicle. The micro-processing system may be further configured to alter the flight trajectory of the first luminous flying vehicle in response to the position of the first luminous flying vehicle.

In another aspect, a luminous pixel array system, comprises: at least one luminous flying vehicle, the at least one luminous flying vehicle corresponding to at least one pixel of a luminous pixel array; and a control system configured to wirelessly communicate with the at least one luminous flying vehicle.

The at least one luminous flying vehicle may include a plurality of luminous flying vehicles. Two luminous flying vehicles of the plurality of luminous flying vehicles may include one selected from the group consisting of: rotary-wing luminous flying vehicles, fixed-wing luminous flying vehicles and aerostat luminous flying vehicles.

The at least one luminous flying vehicle may include at least one luminous element constructed and arranged to emit radiation in the visible spectrum. The at least one luminous element may include one selected form the group consisting of: an electron stimulated device, an incandescent lamp device, an electroluminescent lamp device, a gas discharge lamp device, and a high-intensity discharge lamp device.

The luminous pixel array system may further include an optical motion capture system configured to transmit captured images of the at least one luminous flying vehicle to the control system. The optical motion capture system may include at least one infrared image capturing device. The optical motion capture system may include at least one optical image capturing device. The control system may be configured to reconstruct the spatial position of the at least one luminous flying vehicle based on the captured images. The control system may be further configured to determine a position and trajectory of the at least one luminous vehicle based on the captured images. The control system may be further configured to compute control commands based on a predetermined image-creating event stored in memory of the control system. The control commands may be transmitted by the control system to the at least one luminous flying vehicle. A vehicle control system of the luminous flying vehicle may alter at least one of a flight trajectory and a luminous element color and intensity according to the control commands received from the control system. The predetermined image-creating event may include at least one of flight trajectory data and image/sequence data. The flight trajectory data may include a plurality of desired spatial positions for the at least one luminous flying vehicle as a function of time. The flight trajectory data may include a mathematical function describing a geometry of a flight trajectory of the at least one luminous flying vehicle as a function of time. The image/sequence data may include a plurality of luminous element color and intensity values for the at least one luminous flying vehicle as a function of time.

The control system may be configured to transmit the control commands to the at least one luminous flying vehicle. The at least one luminous flying vehicle may execute synchronized motions in space corresponding to control commands received from the control system.

The optical motion capture system may be configured to transmit the captured images of the at least one luminous flying vehicle to the control system via at least one of a wired communication line and a wireless communication link. The control system may include a memory device having a predetermined image-creating event stored therein. The control system may be configured to preprogram the at least one luminous flying vehicle with a predetermined flight trajectory and image/sequence. The at least one luminous flying vehicle may execute the image-creating event in response to the preprogramming of the predetermined flight trajectory and image/sequence.

The control system may be further configured to transmit initialization and synchronization signals to the at least one luminous flying vehicle so as to coordinate the commencement and execution of the predetermined image-creating event by the at least one luminous flying vehicle.

The at least one luminous flying vehicle may include a plurality of luminous flying vehicles.

In another aspect, A luminous pixel array, comprises: a plurality of luminous flying vehicles arrange in 3-dimensional space, wherein each luminous flying vehicle corresponds to at least one pixel of the luminous pixel array, and wherein each luminous flying vehicle of the plurality of luminous flying vehicles comprises at least one luminous element constructed and arranged to emit radiation in the visible spectrum.

The plurality of luminous flying vehicles may be arranged in space so as to form a 2-dimensional canvas in space. Each of the plurality of luminous flying vehicles may be configured to change one of a color and an intensity of light emitted by the at least one luminous element so as to render first and second 2-dimensional images in space. The plurality of luminous flying vehicles may be suspended in space. The plurality of luminous flying vehicles may be airborne. The plurality of luminous flying vehicles may be arranged in space so as to form a 3-dimensional shape in space. Each of the plurality of luminous flying vehicles may be configured to change one of a color and an intensity of light emitted by the at least one luminous element so as to create first and second 3-dimensional shapes in space.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

DETAILED DESCRIPTION OF EMBODIMENTS

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

Figure 1A:
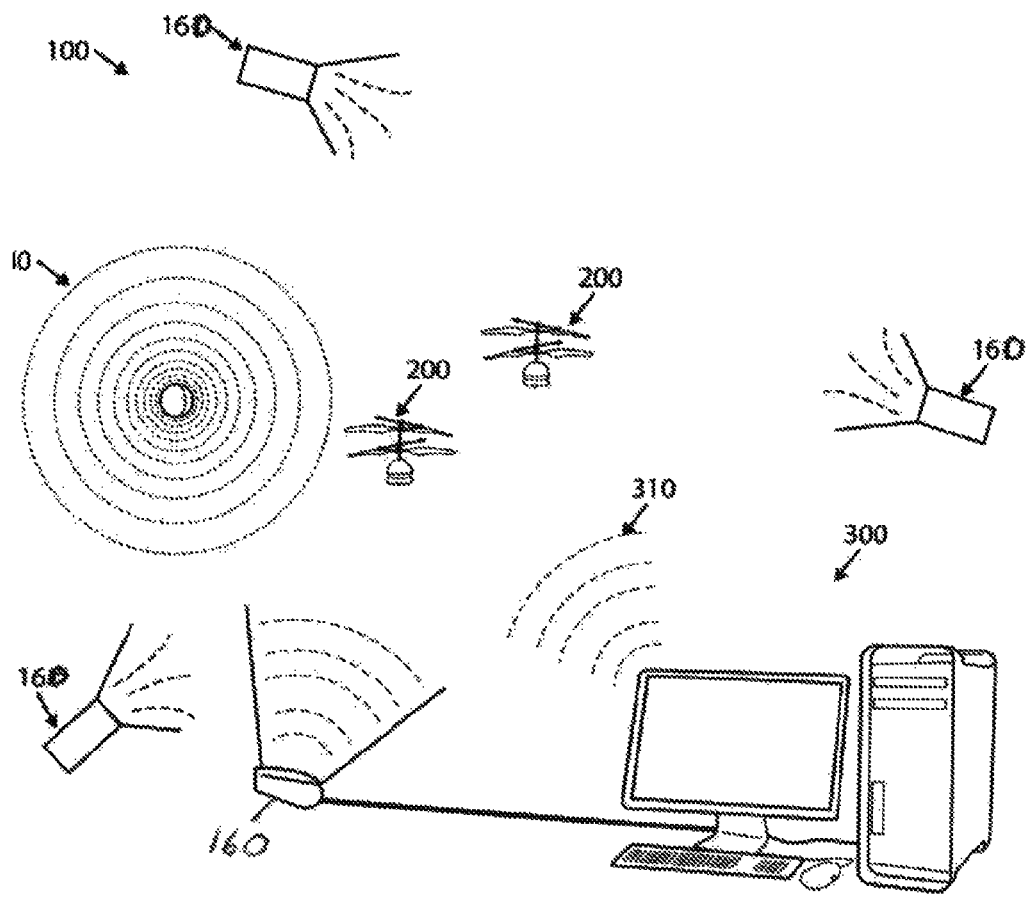
FIG. 1A is an architectural view of 3-dimensional luminous pixel array system in accordance with embodiments of the present inventive concepts.

FIG. 1 is an architectural view of 3-dimensional luminous pixel array system in accordance with embodiments of the present inventive concepts. A 3-dimensional pixel array system 100 can comprise a plurality of luminous flying vehicles 200, a control system 300, at least one of a navigation positioning system 150 and/or a motion capture system 160 such as an optical motion capture system.

In some embodiments, the 3-dimensional pixel array system 100 can comprise two or more luminous flying vehicles 200; however, in other embodiments, the 3-dimensional pixel array system 100 can comprise a single luminous flying vehicle 200.

In some embodiments, each luminous flying vehicle 200 corresponds to single pixel of a 3-dimensional pixel array. However, in other embodiments, each luminous flying vehicle 200 can correspond to two or more pixels of a 3-dimensional pixel array. For example, in some embodiments, each luminous flying vehicle 200 can comprise two or more luminous elements 230, such as the luminous flying vehicle 200 illustrated in FIG. 2A. As such, a luminous flying vehicle 200 having two or more luminous elements 230 can be configured to operate as a single pixel, wherein each of the two or more luminous elements 230 operate in unison, or can be configured to operate as two or more pixels, wherein each of the two or more luminous elements 230 operate independently of one another. In other embodiments, each luminous flying vehicle 200 can comprise a single luminous element 230.

In some embodiments, each luminous flying vehicle 200 can comprise a space-based global navigation satellite system receiver, such as a Global Positioning System (GPS) receiver and/or a Galileo Satellite Navigation receiver that can be configured to receive broadcast signals from one or more navigation positioning systems 150, such as GPS satellites and/or Galileo satellites.

In some embodiments, each luminous flying vehicle 200 can comprise an earth-based global navigation satellite system receiver, such as an emulated Global Positioning System (eGPS) receiver, that can be configured to receive broadcast signals from one or more navigation positioning systems 150, such as eGPS systems. An eGPS may include one or more beacons that are configured to emit signals similar to those emitted by GPS satellites and/or Galileo satellites. The one or more beacons can be arranged about a periphery of an operating volume to emit emulated positioning signals. For example, these beacons of an eGPS may be arranged in areas where conventional GPS and/or Galileo positioning signals are weak or non-existent, which can occur when there is an obstructed line of sight to one or more GPS or Galileo satellites.

Accordingly, luminous flying vehicles 200 having satellite system receivers can determine their position in space onboard. That is, each luminous flying vehicle 200 having a satellite system receiver can independently determine its position in space without the aid of the control system 300. Further, in some embodiments, the luminous flying vehicles 200 having satellite system receivers can be configured to transmit their position in space to the control system 300 and/or to one or more other luminous flying vehicles 200.

Referring to FIG. 1, the luminous flying vehicles 200 can be controlled via a control system 300, such as a server cluster, a computer system or other type of electronic control system. The control system 300 can comprise a wireless transceiver 310 that is configured to transmit control data to the two or more luminous flying vehicles 200. In some embodiments, the control system 300 and/or the wireless transceiver 310 is/are configured to broadcast control data packets to each of the two or more luminous flying vehicles 200. In other embodiments, the control system 300 and/or the wireless transceiver 310 is/are configured to multicast control data packets to one or more luminous flying vehicles 200. In other embodiments, the control system 300 and/or the wireless transceiver 310 is/are configured to unicast control data packets to one of the luminous flying vehicles 200. In some embodiments, the control system and/or wireless transceiver 310 is/are configured to receive vehicle data from one or more of the luminous flying vehicles 200.

The control commands transmitted by the control system 300 can comprise at least one of position data (e.g., Cartesian coordinates, polar coordinates, celestial coordinates, ecliptic coordinates, geographic coordinates, etc.), flight and trajectory data (e.g., direction and speed of flight) and image data (e.g., luminous element color and intensity) for one or more luminous flying vehicles 200.

The vehicle data transmitted to the control system 300 can comprise at least one of GPS position data, RSSI position data, flight and trajectory data, and system diagnostic data (e.g., system health, battery charge, etc.).

For purpose of the present disclosure, the terms "transmit", "transmitted" and "transmitting" as used herein includes various types data packet routing and distribution schemes, including but not limited to: anycast schemes, broadcast schemes, multicast schemes and unicast schemes.

In some embodiments, the control system 300 can comprises a motion capture system 160 such as an optical motion capture system. In one embodiment, the optical motion capture system can comprise one or more image capturing devices or infrared (IR) cameras. The motion capture system 160 can be configured to track the position of one or more luminous flying devices 200 by capturing one or more images of the luminous flying vehicles 200, and allows the control system 300 to reconstruct the spatial position of the one or more luminous flying vehicles 200.

The motion capture system 160 may include a digital optical motion capture system, such as a Vicon optical motion capture system by Vicon Motion Systems of Centennial, Colo., USA, a division of OMG plc of Oxford, UK or a optical motion capture system by NaturalPoint, Inc. of Corvallis, Oreg., USA.

In some embodiments, the motion capture system 160 may include at least three cameras positioned about an operating volume so that each luminous flying vehicle 200 of the system 100 is visible by at least there cameras of the system 100. The control system 300 may reconstruct the spatial position of the luminous flying vehicles 200 based on the images captured by the cameras of the motion capture system 160.

FIGS. 2A-2D illustrate luminous flying vehicles in accordance with exemplary embodiments of the present inventive concepts. Luminous flying vehicles 200, such as fixed-wing luminous flying vehicles 270, rotary-wing luminous flying vehicles 280 and aerostat luminous flying vehicles 290, can comprise control circuitry 201 (see for example, FIG. 2E) including one or more luminous elements 230, 230*a-d* and an optional optical identification element 231.

Figure 2A:
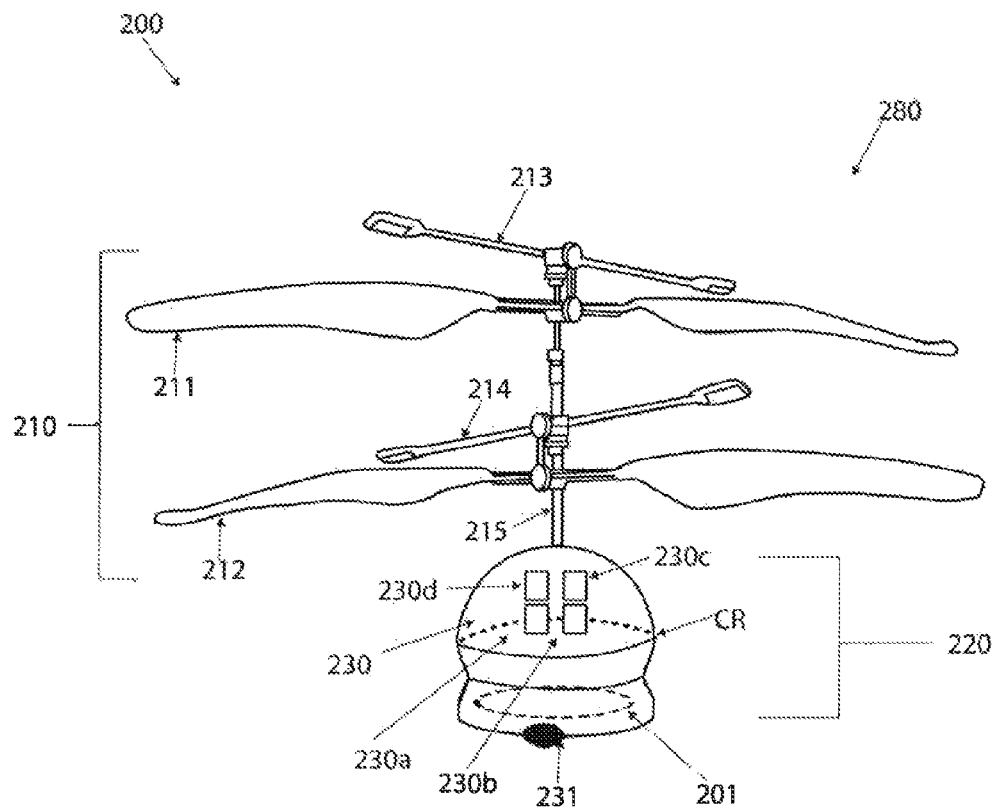
FIGS. 2A-2D illustrate luminous flying vehicles in accordance with embodiments of the present inventive concepts.
Figures 2B, 2C, 2D:
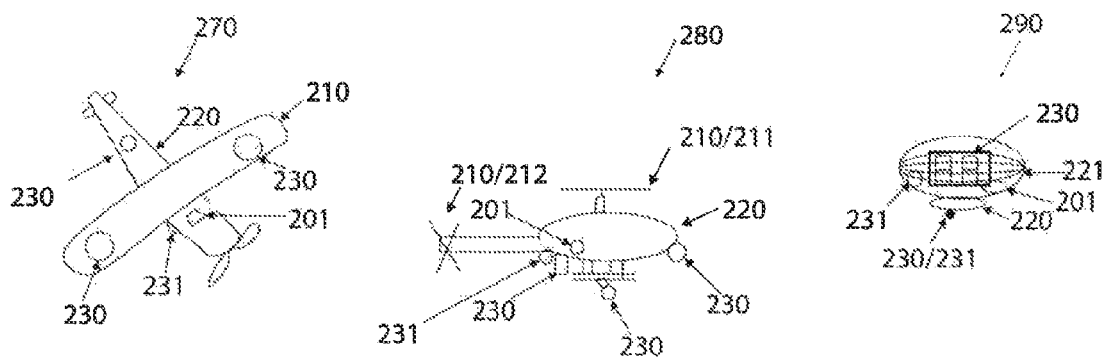

Referring to FIGS. 2A and 2C, generally, rotary-wing luminous flying vehicles 280 are heavier-than-air flying machines that use lift generated by wings, such as rotor blades, that revolve around a body to achieve flight.

Referring to FIG. 2B, generally, fixed-wing luminous flying vehicles 270 are heavier-than-air flying machines that use forward motion to generate lift via wings mounted to a body to achieve flight.

Referring to FIG. 2D, generally, aerostat luminous flying vehicles 290 are lighter-than-air flying machines that achieve flight primarily through the use of buoyant lighter-than-air gases housed in a chamber.

Referring back to FIGS. 2A-2D, the luminous flying vehicles 200 described herein can comprise varying amounts of luminous elements 230. For example, in some embodiments, each luminous flying vehicle 200 can comprise one or more luminous elements 230. In some embodiments, each luminous flying vehicle 200 can comprise two or more luminous elements 230 that can be configured to operate in sequence so as to form a single pixel. In some embodiments, each luminous flying vehicle 200 can comprise two or more luminous elements 230 that can be configured to operate independently of one another so as to form two or more pixels.

The luminous elements 230 can comprise one or more electric powered luminous devices, such as electron stimulated devices, incandescent lamp devices, electroluminescent lamp devices, gas discharge lamp devices and high-intensity discharge lamp devices. Examples of electron stimulated devices include electron stimulated luminescence (ESL) light bulbs and cathode ray tub (CRT) devices. Examples of electroluminescent lamps include light-emitting diodes (LEDs), such as organic LEDs, polymer LEDs, solid-state lighting, LED lamps, electroluminescent sheets and electroluminescent wires. Examples of gas discharge lamp devices include fluorescent lamps, compact fluorescent lamps (CFLs), neon and argon lamps, plasma lamps and xenon flash lamps. Examples of high-intensity discharge lamp devices include carbon arc lamps, ceramic discharge metal halide lamps, hydrargyrum medium-arc iodide lamps, mercury-vapor lamps, metal halide lamps, sodium vapor lamps and xenon arc lamps.

The luminous elements 230 can further comprise electronic display devices such as LED displays, electroluminescent displays (ELDs), plasma display panels (PDPs), liquid crystal displays (LCDs), thin-film transistor displays (TFTs), organic light-emitting diode displays (OLEDs) and surface-conduction electron-emitter displays (SEDs).

The optional optical identification element 231 can comprise one or more infrared light-emitting diodes (IRLEDs), which, in some embodiments, can be tracked via the optical motion capture system 160 of the control system 300. In other embodiments, the optical identification element 231 may include a reflector that reflects a predetermined spectrum of light. For example, in embodiments where the optical identification element 231 includes a reflector, the system 100 may further include one or more light sources 161 that illuminate the operating volume with the predetermined spectrum of light, such as infrared light (see light sources 161 illustrated in FIG. 1). Accordingly, luminous flying vehicles 200 within the operating volume may reflect the light emitted by the one or more lights sources, which in turn can be captured by the optical motion capture system 160.

Referring to FIG. 2A, a luminous flying vehicle 200, such as a rotary-wing luminous flying vehicle 280, can comprise a main body 220 and one or more propellers 210. For example, the rotary-wing luminous flying vehicle 280 can comprise a quad-rotor helicopter design having first through fourth propellers 211-214 mounted vertically with respect to the main body 220 so as to provide lift and stability control. The rotary-wing luminous flying vehicles 280 can be controlled in all axes of space.

In this exemplary embodiment, the rotary-wing luminous flying vehicle 280 comprises a plurality of luminous elements 230, 230a-d positioned on sides of the main body 220 of the rotary-wing luminous flying vehicle 280. In addition, an optional optical identification element 231 is shown positioned on a lower portion of the main body 220 of the rotary-wing luminous flying vehicle 280. However, in other embodiments, the luminous elements 230, 230a-d can be positioned within a central portion of the main body 220 of the rotary-wing luminous flying vehicle 280. The luminous elements 230, 230a-d can emit light from outer surfaces of a translucent or opaque main body 220. That is, in some embodiments, the luminous elements 230, 230a-d can emit light from the entire circumference CR (i.e., 360°) of the main body 220 of the rotary-wing luminous flying vehicle 280.

Referring to FIG. 2B, a luminous flying vehicle 200, such as a fixed-wing luminous flying vehicle 270, can comprise a main body 220 and wings 210. In this exemplary embodiment, the fixed-wing luminous flying vehicle 280 comprises a plurality of luminous elements 230 positioned on the wings 210 and/or main body 220 of the vehicle 270. In addition, an optional optical identification element 231 is shown positioned on a lower portion of the main body 220.

Referring to FIG. 2C, a luminous flying vehicle 200, such as a rotary-wing luminous flying vehicle 280, can comprise a main body 220 and one or more propellers 210. For example, the rotary-wing luminous flying vehicle 280 can comprise a dual-rotor helicopter design having first and second propellers 211-212 so as to provide lift and stability control.

In this exemplary embodiment, the rotary-wing luminous flying vehicle 280 comprises a plurality of luminous elements 230, positioned on sides of the main body 220 and/or lower rails of the main body 220. In addition, an optional optical identification element 231 is shown positioned on a lower portion of the main body 220 of the rotary-wing luminous flying vehicle 280.

Referring to FIG. 2D, a luminous flying vehicle 200, such as aerostat luminous flying vehicle 290, can comprise a main body 220 and a gas chamber 221. In this exemplary embodiment, the aerostat luminous flying vehicle 280 comprises a plurality of luminous elements 230, positioned on sides of the main body 220 and/or sides of the gas chamber 221. In one embodiment, the luminous element(s) 230 positioned on the sides of the gas chamber 221 can comprise, for example, a multi-pixel display device or panel.

Figure 2E:
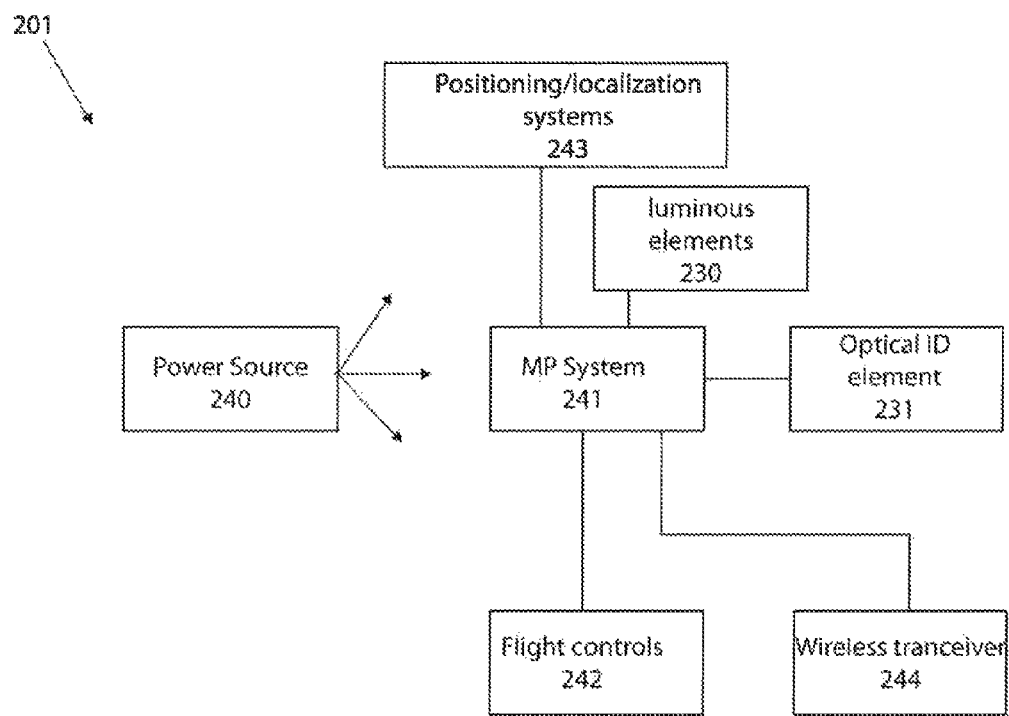
FIG. 2E is a block diagram of a control circuit of a luminous flying vehicle in accordance with embodiments of the present inventive concepts.

FIG. 2E is a block diagram of a control system of a luminous flying vehicle in accordance with embodiments of the present inventive concepts. A vehicle control system 201 can comprise a micro-processing system 241, positioning and localization systems 243, luminous elements 230, optional optical identification elements 231, wireless transceivers 244, flight control systems 242 and a power source 240. Some elements having the same functions as those described above are indicated by like reference identifiers, and thus their detailed description will not be repeated.

The micro-processing system 241 can comprise one or more processors that are capable of communicating with and controlling the positioning and localization systems 243, the luminous elements 230, the optical identification elements 231, the wireless transceivers 244 and the flight control systems 242 of the vehicle control system 201. In this manner, the micro-processing system 241 can control the flight path of the luminous flying vehicle 200, along with the color and/or light intensity of the luminous elements 230 positioned thereon.

In some embodiments, the positioning and localization systems 243 can comprise a 3-axis accelerometer, a gyroscope, a magnetometer and a navigation positioning system receiver, and can communicate positioning and localization data and/or vehicle data to the micro-processing system 241. In some embodiments, the micro-processing system 241 can configure the wireless transceiver 244 to transmit vehicle data to the control system 300 and/or other luminous flying vehicles 200.

The positioning and localization systems 243 may be configured to determine a position of the luminous flying vehicle 200 via one or more of the following positioning systems: GPS, eGPS, Ultrasonic receiver systems and received signal strength indicator (RSSI) systems.

For example, positioning and localization systems 243 including ultrasonic receiver systems may include an ultrasonic receiver configured to receive ultrasonic chirps from a plurality of ultrasonic transmitters placed about an operating volume. Ultrasonic transmitters, having known positions, can be configured to successively emit ultrasonic chirps with a time delay between the chirps of different transmitters. A synchronization event prior to the emission of a sequence of chirps may allow the ultrasonic receiver system to calculate time of flight information so that a position of the luminous flying vehicle 200 can be determined.

Positioning and localization systems 243 including RSSI systems can include a radio transceiver configured to determine radio signal strength of a signal emitted by a radio transceiver of another luminous flying vehicle 200. The signal strength can then be used to estimate the distance to a radio transmitter. In addition, the system 100 may include several identifiable transmitters positioned about the operating volume to allow the receivers to triangulate their positions in 3D space. In some embodiments, the RSSI system can be included within the wireless transceiver 233 (e.g., ZigBee transceivers).

The wireless transceiver 244 can comprise a wireless sensor network transceiver, such as a ZigBee transceiver, a EnOcean transceiver, Personal area network transceiver, a Bluetooth transceiver, a TransferJet transceiver and/or an Ultra-wideband transceiver, and can further comprise a wireless network transceiver, such as a Wireless LAN (WLAN) transceiver (e.g., IEEE 802.11, WiFi) and/or a Broadband Fixed Access (BWA) transceiver (e.g., LMDS, WiMAX). In some embodiments, the wireless transceiver 244 can be configured to communicate with one or more wireless transceivers 244 of other luminous flying vehicles 200 and/or with a wireless transceiver 310 of a control system 300.

The flight controls 242 can comprise various motor drivers, actuating systems and control devices that are associated with the flight control of the luminous flying vehicles 200 described herein.

The power source 240 can comprise one or more batteries configured to provide electrical power to the systems, devices and elements of the vehicle control system 201.

Figure 3A:
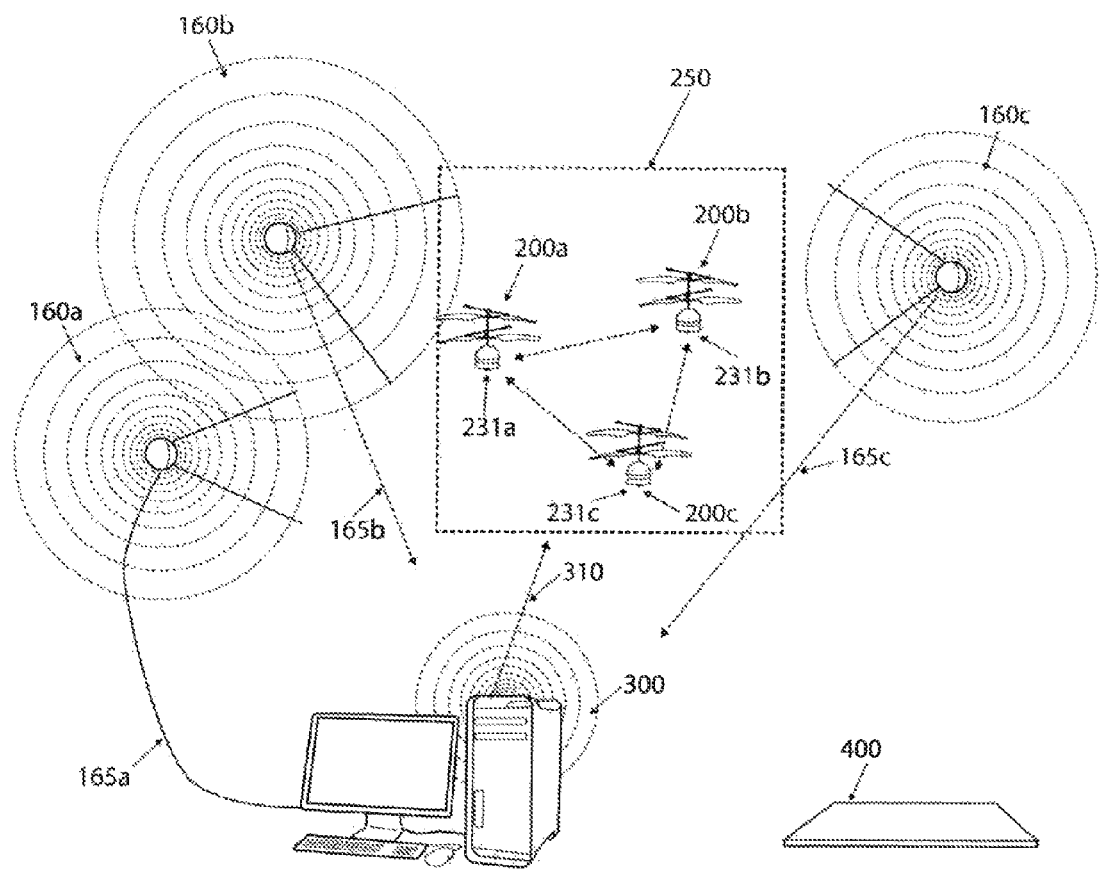
FIG. 3A illustrates a centralized localization system and method of controlling a 3-dimensional luminous pixel array in accordance with embodiments of the present inventive concepts.
Figure 3B:
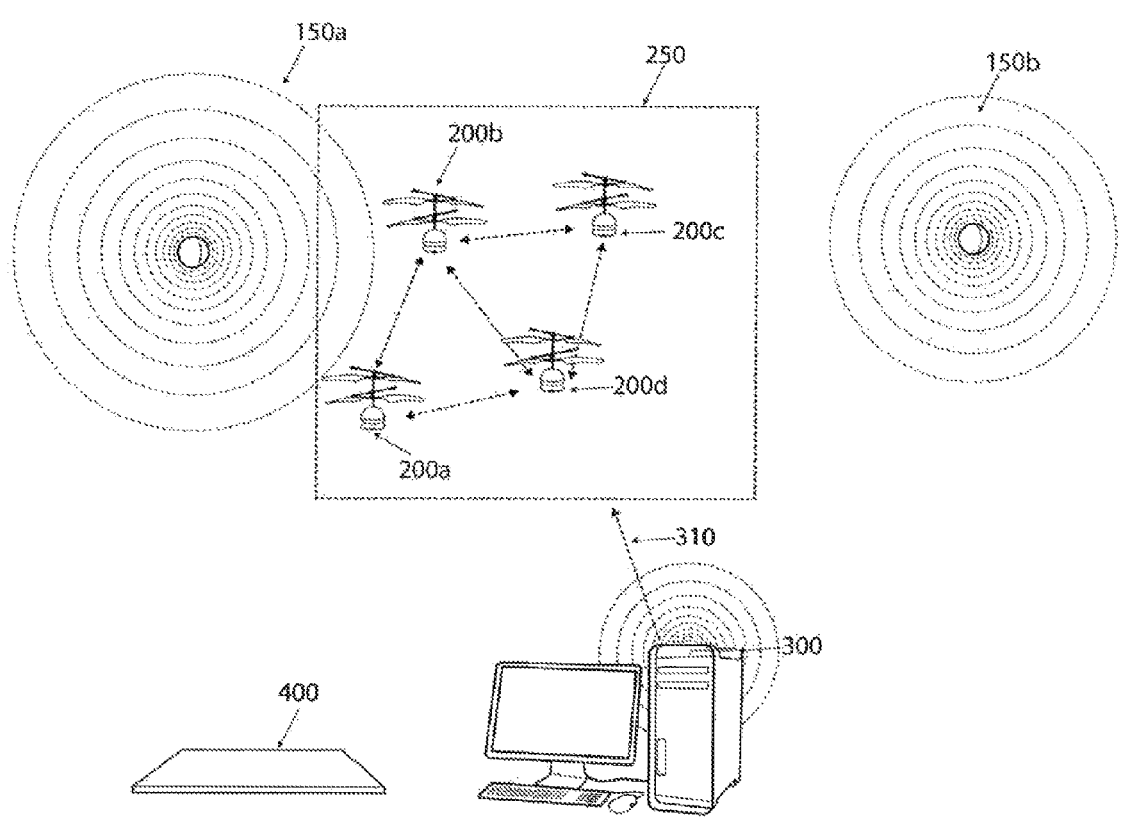
FIG. 3B illustrates a decentralized localization system and method of controlling a 3-dimensional luminous pixel array in accordance with embodiments of the present inventive concepts.
Figure 3C:
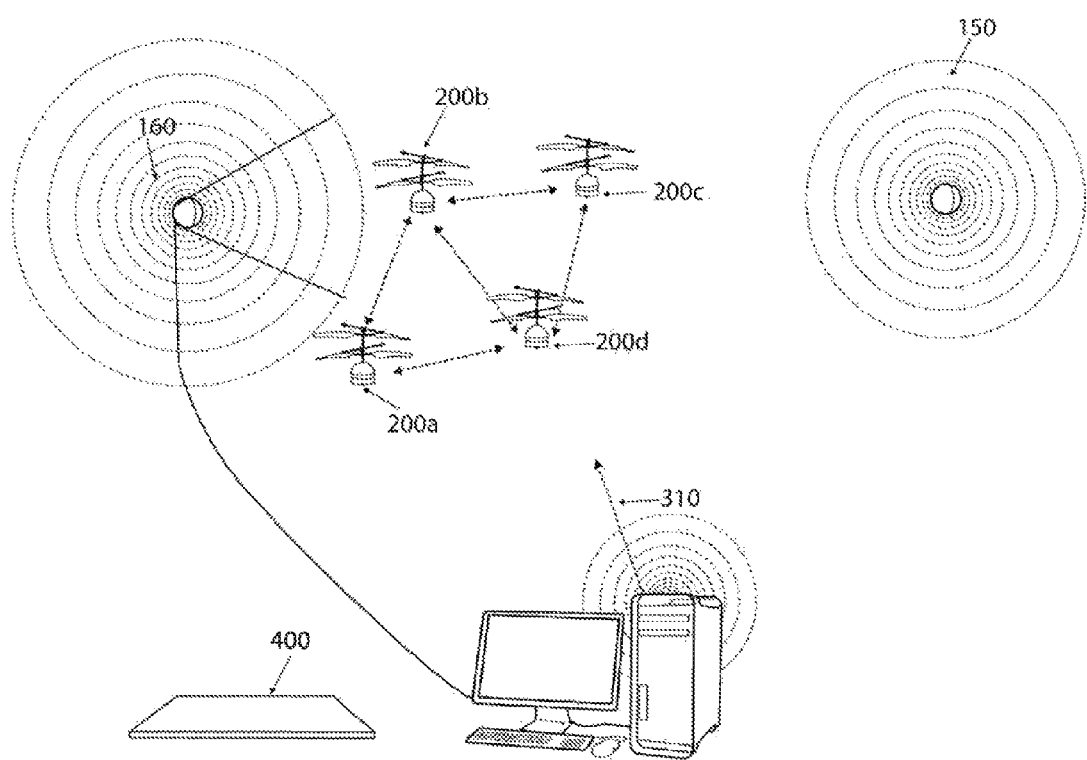
FIG. 3C illustrates a hybrid localization system and method of controlling a 3-dimensional luminous pixel array in accordance with embodiments of the present inventive concepts.

FIGS. 3A-3C illustrate various systems and methods of controlling a 3-dimensional luminous pixel array system in accordance with embodiments of the present inventive concepts. A 3-dimensional luminous pixel array system can comprise a plurality of luminous flying vehicles 200, 200a-d and an optional vehicle charging station 400. Some elements having the same functions as those described above are indicated by like reference identifiers, and thus their detailed description will not be repeated.

The optional vehicle charging station 400 can be provided with a 3-dimensional luminous pixel array system. The vehicle charging station 400 can be constructed and arranged to charge the power source 240 of one or more of the luminous flying vehicles 200, 200a-d. In some embodiments, the vehicle charging station 400 is constructed and arranged to provide a charging current to one or more of the luminous flying vehicles 200, 200a-d via a wired connection. In some embodiments, the vehicle charging station 400 is constructed and arranged to provide a charging current to one or more of the luminous flying vehicles 200, 200a-d via a wireless connection (e.g., induction charging).

A 3-dimensional luminous pixel array system can comprise a single flying pixel or luminous flying vehicle, or can comprise any number of flying pixels or luminous flying vehicles. In some embodiments, a 3-dimensional luminous pixel array system can comprise at least 25 flying pixels or luminous flying vehicles 200. In some embodiments, a 3-dimensional luminous pixel array system can comprise at least 50 flying pixels or luminous flying vehicles 200. In some embodiments, a 3-dimensional luminous pixel array system can comprise at least 100 flying pixels or luminous flying vehicles 200. In some embodiments, a 3-dimensional luminous pixel array system can comprise at least 1000 flying pixels or luminous flying vehicles 200. In some embodiments, a 3-dimensional luminous pixel array system can comprise at least 2000 flying pixels or luminous flying vehicles 200. In some embodiments, a 3-dimensional luminous pixel array system can comprise at least 5000 flying pixels or luminous flying vehicles 200.

For the purpose of the present description, the terms "centralized localization" and "off-board localization" as used herein relate to systems and methods for controlling a 3-dimensional luminous pixel array wherein the position of each luminous flying vehicle is determined by one or more systems, devices or elements that are separate from each luminous flying device.

For the purpose of the present description, the terms "decentralized localization" and "on-board localization" as used herein relate to systems and methods for controlling a 3-dimensional luminous pixel array wherein the position of each luminous flying vehicle is determined by one or more systems, devices or elements that are part of each luminous flying device.

For the purpose of the present description, the term "hybrid localization" as used herein defines systems and methods for controlling a 3-dimensional luminous pixel array wherein the position of each luminous flying vehicle is determined by one or more systems, devices or elements that are part of each luminous flying device and one or more systems, devices or elements that are separate from each luminous flying device.

FIG. 3A illustrates a centralized localization system and method of controlling a 3-dimensional luminous pixel array in accordance with embodiments of the present inventive concepts. In a centralized localization scheme, the spatial positions of a plurality of luminous flying vehicles 200, 200a-c can be determined and/or tracked by an off-board system, such as a control system 300 having a motion capture system 160 such as an optical motion capture system (e.g., optical image/video capturing device) or an electromagnetic object detection system (e.g., radar devices and systems).

In this exemplary embodiment, the motion capture system 160 comprises one or more optical motion capture devices 160a-c, which can comprise image capturing devices such as infrared (IR) cameras. In some embodiments, a first motion capture device 160a is electrically connected to the control system 300 via a wired communication line 165a, and second and third motion capture devices 160b, 160c are wirelessly connected to the control system 300 via wireless communication links 165b, 165c; however, various other wired and wireless configurations are possible. For example, each motion capture device 160a-c can be connected to the control system 300 via one or more wired communication lines, or each motion capture device 160a-c can be wirelessly connected to the control system 300 via one or more wireless communication links.

The motion capture system 160 can be configured to track the positions of the plurality of luminous flying vehicles 200, 200a-c by capturing images of the swarm 250 of luminous flying vehicles 200, 200a-c. For example, in one embodiment, each luminous flying vehicle 200, 200a-c can be provided with an identification element 231, such as an infrared light-emitting diode, that can be tracked by the motion capture system 160. The identification element can emit radiation in a non-visible spectrum so as not to interfere with radiation emitted by the luminous elements 230 of the luminous flying vehicles 200. As a result, the control system 300 can reconstruct the spatial positions of each luminous flying vehicle 200, 200a-c of the swarm 250, and compute control commands to transmit to the plurality of luminous flying vehicles 200, 200a-c.

In some embodiments, IRLEDs of the optical identification elements 231 of each luminous vehicle can be configured to continuously emit radiation in a non-visible spectrum; however, in other embodiments, the IRLEDs may be configured to pulse in various different frequencies so as to emit vehicle identification pulses. The optical tracking systems 160 may capture the radiation emitted by the IRLEDs, which can be output as a set of points in 3D corresponding to marker locations. The control system may be configured to update the position estimates for all of the luminous flying vehicles 200.

In embodiments where the IRLEDs continuously emit radiation, the identification of the luminous flying vehicles 200 can be based on a semi-manual initialization of a point-cloud. For example, this can be accomplished by arranging the luminous flying vehicles 200 in a set initialization arrangement, and labeling one or two of the luminous flying vehicles 200 manually in software and allowing the rest to be labeled automatically.

The control commands can be transmitted by the control system 300 via the wireless transceiver 310, and can comprise position data (e.g., Cartesian coordinates, polar coordinates, celestial coordinates, ecliptic coordinates, geographic coordinates, etc.), flight and trajectory data (e.g., direction and speed of flight) and image data (e.g., luminous element color and light intensity).

In this manner, the control system 300 can compute control commands to transmit to each of the luminous flying vehicles 200, 200a-c using, for example, a fixed control law that is dependent upon the type of vehicle and the on-board control software of each vehicle. Accordingly, the plurality flying pixels or luminous flying vehicles 200, 200a-c can be configured and/or controlled to execute synchronized motions in space to form 2-dimensional and 3-dimensional luminous display surfaces or canvases comprising a plurality of pixels.

FIG. 3B illustrates a decentralized localization system and method of controlling a 3-dimensional luminous pixel array in accordance with embodiments of the present inventive concepts. In a decentralized localization scheme, the spatial positions of a plurality of luminous flying vehicles 200, 200a-d can be determined and/or tracked by on-board systems of the luminous flying vehicles 200, 200a-d, such as vehicle control systems 201 having positioning and localization systems 243.

In this exemplary embodiment, a plurality of navigation positioning systems 150, 150a-b are provided, which can broadcast positioning signals to the luminous flying vehicles 200, 200a-d. The vehicle control systems 201 and/or the positioning and localization systems 243 of the vehicles 200, 200a-d can be configured to receive the positioning signals from one or more of the navigation positioning systems 150, 150a-b, and can be configured to determine the spatial position of each vehicle 200, 200a-d in response to the received positioning signals.

In this manner, the luminous flying vehicles 200, 200a-d can be configured to execute a flight trajectory in space, along with a sequence of image data commands (e.g., pixel color and intensity). Accordingly, the plurality flying pixels or luminous flying vehicles 200, 200a-d can be configured and/or controlled to execute synchronized motions in space to form 2-dimensional and 3-dimensional luminous display surfaces or canvases comprising a plurality of pixels.

In some embodiments, a control system 300 is provided, which can preprogram the luminous flying vehicles 200, 200a-d to execute a predetermined image-creating event. For example, a predetermined image-creating event can comprise a predetermined flight trajectory for each of the luminous flying vehicles 200, 200a-d and a predetermined sequence of image data commands for each of the luminous flying vehicles 200, 200a-d. In addition, in some embodiments, the control system 300 can transmit an initialization and synchronization signal to each of luminous flying vehicles 200, 200a-d so as to synchronize the executing of the image-creating event.

In some embodiments, a control system 300 is provided, which can program the luminous flying vehicles 200, 200a-d to execute an image-creating event that can be updated from time to time, or in real-time. For example, an image-creating event can comprise a flight trajectory for each of the luminous flying vehicles 200, 200a-d and a sequence of image data commands for each of the luminous flying vehicles 200, 200a-d that can be updated by the control system 300. The control system 300 can be configured to transmit the updated image-creating event to each of the luminous flying vehicles 200, 200a-d.

FIG. 3C a hybrid localization system and method of controlling a 3-dimensional luminous pixel array in accordance with embodiments of the present inventive concepts. In a hybrid localization scheme the spatial positions of a plurality of luminous flying vehicles 200, 200a-d can be determined and/or tracked by both an off-board system, such as a control system 300 having a motion capture system 160 (described above with reference to FIG. 3A) and an on-board system, such as vehicle control systems 201 having positioning and localization systems 243 (described above with reference to FIG. 3B).

Figure 4A:
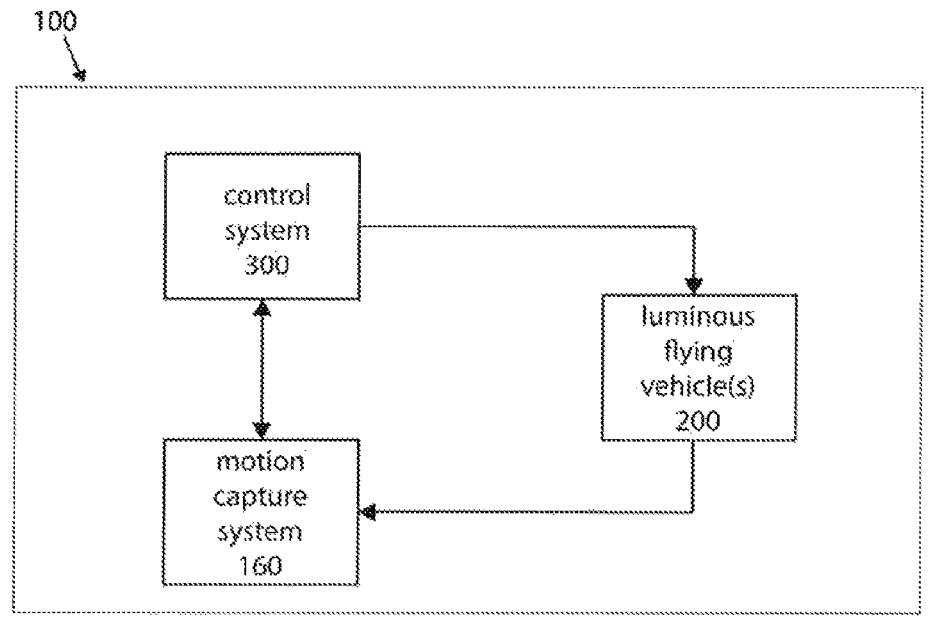
FIG. 4A is a block diagram of a 3-dimensional luminous pixel array system in accordance with embodiments of the present inventive concepts.

FIG. 4A is a block diagram of a 3-dimensional luminous pixel array system in accordance with embodiments of the present inventive concepts. A 3-dimensional luminous pixel array system can comprise a control system 300, an motion capture system 160 such as an optical motion capture system and a plurality of luminous flying vehicles 200, and can be configured in a centralized localization mode.

In a centralized localization mode, the control system 300 can configure the motion capture system 160 to capture images and/or position information of a swarm of luminous flying vehicles 200. In response to receiving the captured image data and/or position information, the control system 300 can reconstruct the spatial positions of each luminous flying vehicle 200 of the swarm. As a result, the control system 300 can compute control commands, and can transmit the control commands to the swarm of luminous flying vehicles 200 so as to execute an image-creating event.

In this manner, the control system 300 can direct the execution of image-creating events by controlling the flight trajectory and position of each of the luminous flying vehicles 200 of the swarm, and can further control the pixel color and light intensity of each of the luminous flying vehicles 200 of the swarm.

Figure 4B:
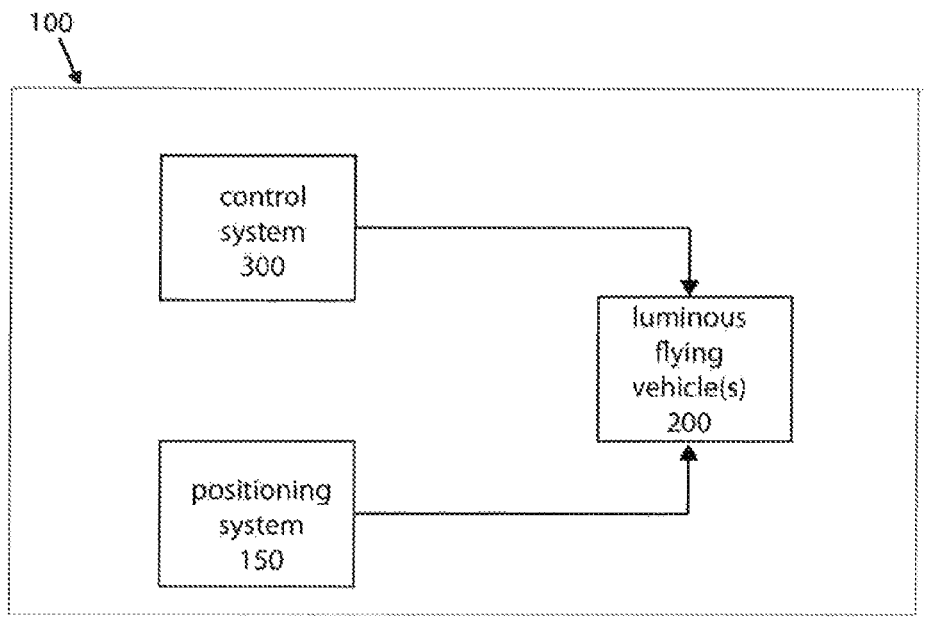
FIG. 4B is a block diagram of a 3-dimensional luminous pixel array system in accordance with embodiments of the present inventive concepts.

FIG. 4B is a block diagram of a 3-dimensional luminous pixel array system in accordance with embodiments of the present inventive concepts. A 3-dimensional luminous pixel array system can comprise a control system 300, one or more navigation positioning systems 150 and a plurality of luminous flying vehicles 200, and can be configured in a decentralized localization mode.

In a decentralized localization mode, the control system 300 can be configured to transmit flight trajectory data and image sequence data to each of the luminous flying vehicles 200 of the swarm, and can be further configured to transmit an initialization and synchronization signal to the swarm of luminous flying vehicles 200. In some embodiments, flight trajectory data and image sequence data is preprogrammed in system memory of each of the luminous flying vehicles 200 of the swarm prior to commencement of the image-creating event; however, in some embodiments, flight trajectory data and image sequence data is transmitted before and during the execution of the image-creating event. In some embodiments, flight trajectory data and image sequence data is updated during the execution of the image-creating event.

Further, each of the luminous flying vehicles 200 of the swarm can be configured to determine its spatial position from positioning signals broadcast by the one or more navigation positing systems 150, and can be further configured to compute flight trajectory commands and image sequence commands based on its determined spatial position, and the flight trajectory data and the image sequence data received from the control system 300.

As a result, each of the luminous flying vehicles 200 of the swarm can be configured to execute an image-creating event according to flight trajectory data and a image sequence data, and can commence and execute the image-creating event in response to the initialization and synchronization signals transmitted by the control system 300.

Figure 5A:
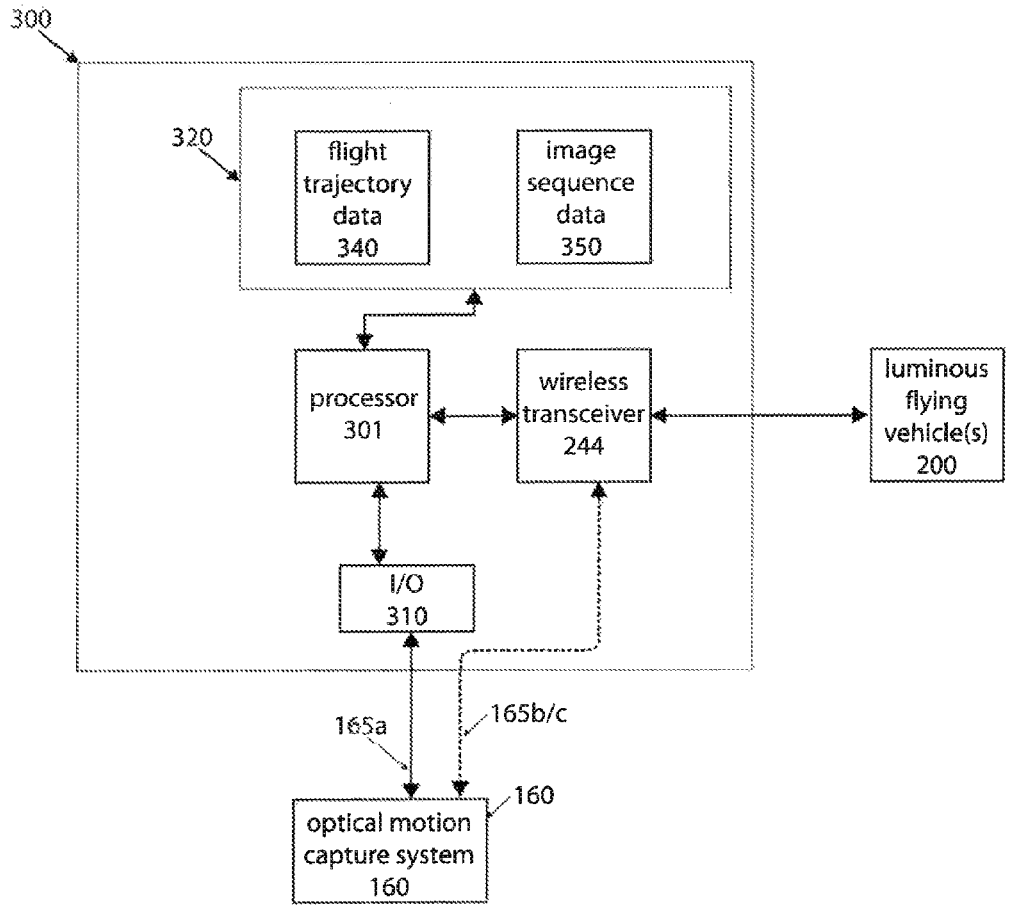
FIG. 5A is a block diagram of a centralized localization control system and method of controlling a 3-dimensional luminous pixel array in accordance with embodiments of the present inventive concepts.

FIG. 5A is a block diagram of a centralized localization control system and method for controlling a 3-dimensional luminous pixel array in accordance with embodiments of the present inventive concepts. A control system 300 can be configured as a centralized localization control system, and can comprise a processor 301, an input/output (I/O) device 310, a memory device 320 and a wireless transceiver 244.

The memory device 320 can comprise random access memory (RAM), read only memory (ROM) or other type of memory device, and can be indirectly or directly connected to the processor 301. In some embodiments, the memory device can be integrated within the processor device 301.

The I/O device 310 can comprise various types of I/O devices known in the art, such as a universal serial bus (USB) interface device, a serial interface device (e.g., RS-232, I2C, SPI), a Firewire interface device (i.e., IEEE 1394) or a combination thereof.

In this exemplary embodiment, the motion capture system 160, described above with reference to FIGS. 3A and 5A, can transmit captured images and/or position data of a swarm of luminous flying vehicles 200 to the control system 300 via at least one of a wired communication line 165a connected to the I/O device 310 and a wireless communication link 165b/c with the wireless transceiver 244. In response to the received captured images and/or position data, the control system 300 can post-process the captured images and/or position data so that positions and trajectories of the luminous flying vehicles 200 of the swarm can be determined.

For example, the processor 301 can be configured to estimate the positions and trajectories of the luminous flying vehicles 200 of the swarm, and can compute control commands to be transmitted via the wireless transceiver 244 to each of the luminous flying vehicles 200 of the swarm. The control commands can comprise position data commands, such as Cartesian coordinates, polar coordinates, celestial coordinates, ecliptic coordinates, geographic coordinates, etc., flight data commands, such as direction and speed of flight, and image date commands, such as luminous element color and intensity for each of the luminous flying vehicles 200 of the swarm.

In some embodiments, the processor 301 can be configured to compute the control commands based on a predetermined image-creating event stored in the memory device 320 of the control system 300 or based on a variable image-creating event. For example, the image-creating event can comprise flight trajectory data 340 for each luminous flying vehicle 200 of the swarm and can comprise image/sequence data 350 for each luminous flying vehicle 200 of the swarm. In one embodiment, the flight trajectory data 340 can comprise the desired spatial position of each luminous flying vehicle 200 of the swarm as a function of time, and the image/sequence data 350 can comprise luminous element 230 color and intensity for each flying vehicle 200 of the swarm as a function of time. In another embodiment, the flight trajectory data 340 can comprise a mathematical function describing the geometry of the flight trajectory for each flying vehicle 200 of the swarm.

Accordingly, the control system 300 can direct the execution of image-creating events by controlling the flight trajectory and position of each luminous flying vehicle 200 of the swarm, and can further control the pixel color and light intensity of each luminous flying vehicle 200 of the swarm. As such, the swarm of luminous flying vehicles can be configured and/or controlled to execute synchronized motions in space to form luminous display surfaces of varying shapes and colors.

Figure 5B:
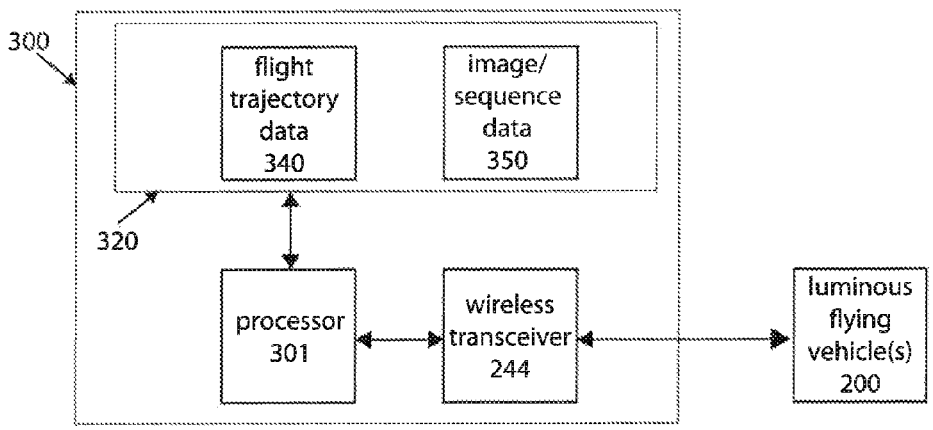
FIG. 5B is a block diagram of a decentralized localization control system and method of controlling a 3-dimensional luminous pixel array in accordance with embodiments of the present inventive concepts.

FIG. 5B is a block diagram of a decentralized localization control system and method of controlling a 3-Dimensional luminous pixel array in accordance with embodiments of the present inventive concepts. A control system 300 can be configured as a decentralized localization control system, and can comprise a processor 301, a memory device 320 and a wireless transceiver 244.

In this exemplary embodiment, the control system 300 can be configured to transmit flight trajectory data 340 and image sequence/data 350 stored in the memory device 320 to each of the luminous flying vehicles 200 of the swarm via the wireless transceiver 244. In some embodiments, the control system 300 is configured to preprogram each of the luminous flying vehicles 200 with flight trajectory data 340 and image/sequence data 350 prior to execution of an image-creating event. In some embodiments, the control system 300 is configured to transmit the flight trajectory data 340 and image sequence data 350 during the execution of an image-creating event.

In addition, the control system 300 can be further configured to transmit an initialization and synchronization signal to each of the luminous flying vehicles 200 of the swarm so as to coordinate the commencement and execution of an image-creating event.

Accordingly, the control system can transmit flight data and image/sequence data to each of the luminous flying vehicles 200 of the swarm, and can be configured to initialize an image-creating event by transmitting initialization and synchronization signals to the swarm of luminous flying vehicles 200.

Figure 6A:
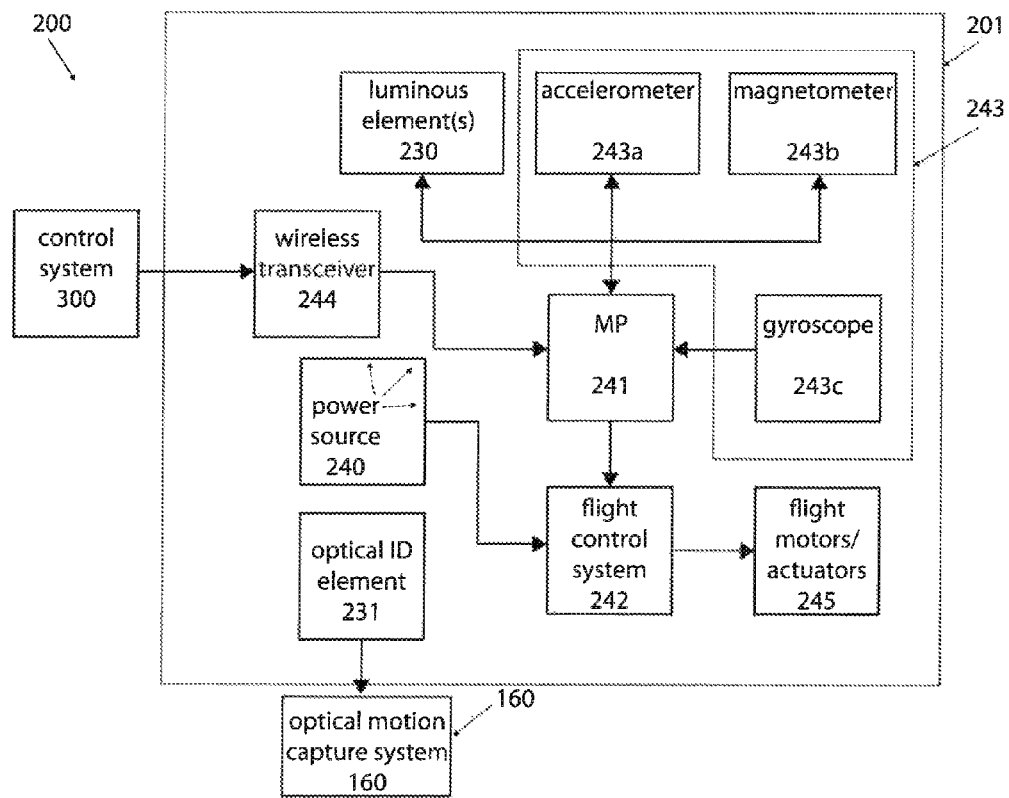
FIGS. 6A and 6B are block diagrams illustrating luminous flying vehicle control systems in accordance with embodiments of the present inventive concepts.
Figure 6B:
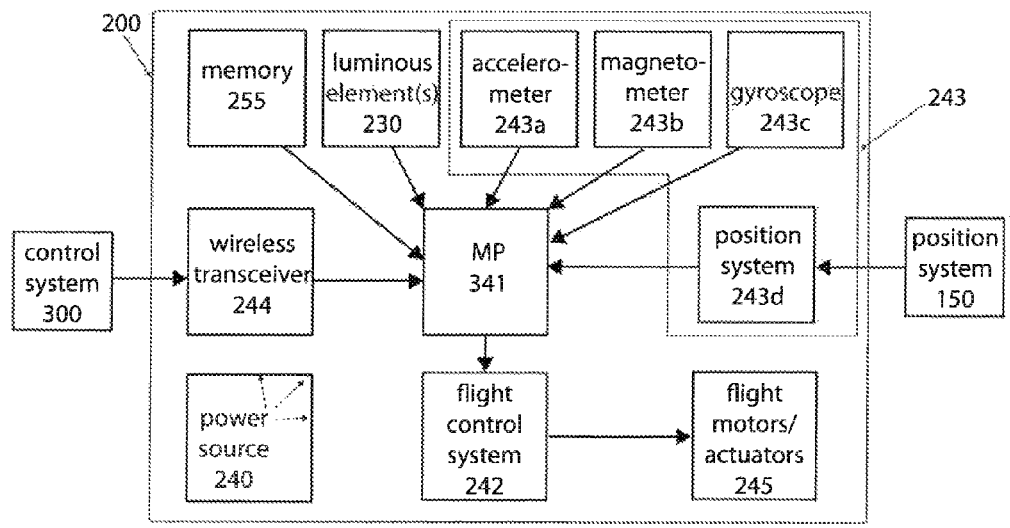

FIGS. 6A and 6B are block diagrams illustrating luminous flying vehicle control systems in accordance with embodiments of the present inventive concepts. Some elements having the same functions as those described above are indicated by like reference identifiers, and thus their detailed description will not be repeated.

A control system 201 of a luminous flying vehicle 200 can comprise micro-processing system 241, positioning and localization systems 243, luminous elements 230, optional optical identification elements 231, wireless transceivers 244, flight control systems 242, flight motors and actuating systems 245 and one or more power sources 240.

Referring to FIG. 6A, in a centralized localization scheme, the spatial positions of a plurality of luminous flying vehicles 200, 200a-c can be determined and/or tracked by an off-board system, such as a control system 300 having a motion capture system 160 such as an optical motion capture system (e.g., optical image/video capturing device) or an electromagnetic object detection system (e.g., radar devices and systems). Accordingly, each of the plurality of luminous flying vehicles 200 may include an optical ID element, such as an IRLED and/or a reflector, which can emit radiation. This radiation can then be captured by a motion capture system 160, and positions of each of the luminous flying vehicles 200 can be determined and/or tracked by a control system 300. The control system 300 may then transmit control commands to each of the luminous flying vehicles 200 via wireless communication links.

Referring to FIG. 6B, in a decentralized localization scheme, the spatial positions of a plurality of luminous flying vehicles 200, 200a-d can be determined and/or tracked by on-board systems of the luminous flying vehicles 200, 200a-d, such as vehicle control systems 201 having positioning and localization systems 243. The positioning and localization systems 243 of each luminous flying vehicle 200 may include one or more subsystems 243a-c, which can be selected from the group consisting of: a 3-axis accelerometer, a gyroscope, a magnetometer and a navigation positioning system receiver.

Accordingly, the luminous flying vehicles 200 can be configured to execute a flight trajectory in space, along with a sequence of image data commands (e.g., pixel color and intensity), which can be stored in system memory 255.

FIGS. 7A, 7B, 8A and 8B are flow diagrams illustrating methods of controlling a luminous flying vehicles, in accordance with embodiments of the present inventive concepts.

The methods described herein can be implemented by the systems and devices described herein, or equivalent systems, executing a unique set of instructions stored in system or device memory. As will be appreciated by those skilled in the art, a unique set of instructions can be implemented or embodied in software, firmware, or a combination thereof. As such, the unique set of instructions stored in system memory transform the systems and devices into particular, special purpose systems that can operate, for example, according to the following exemplary flow diagrams. In some embodiments, unique sets of instructions correspond to the operations and methods described in connection with the following flow diagrams.

Figure 7A:
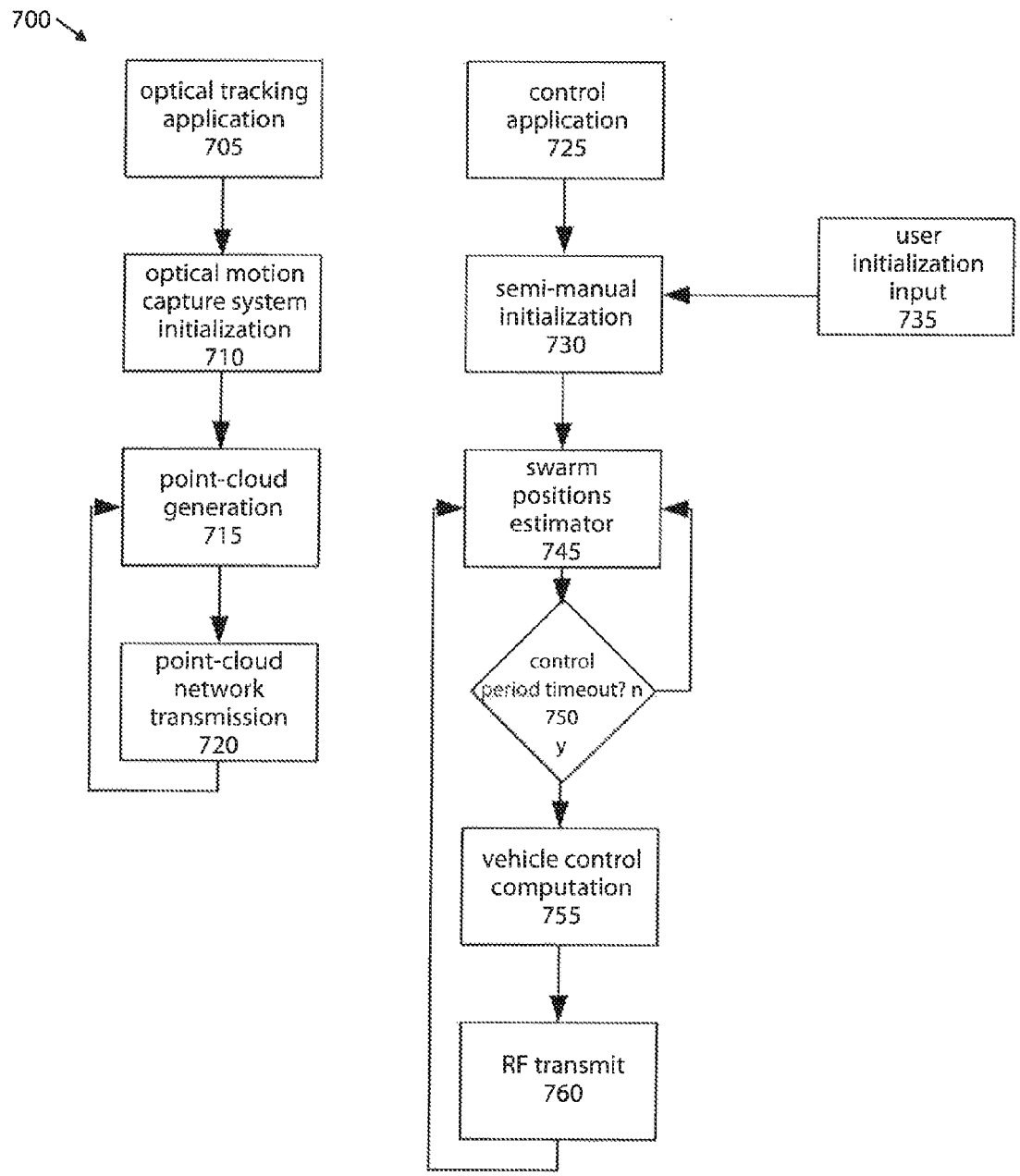
FIGS. 7A, 7B, 8A and 8B are flow diagrams illustrating methods of controlling luminous flying vehicles in accordance with embodiments of the present inventive concepts.

FIG. 7A is a flow diagram of a method 700 of controlling a 3-dimensional pixel array system, in accordance with embodiments of the present inventive concepts. A control system 300 may be configured according to a centralized localization scheme, for example, as described above with reference to FIGS. 3A and 4A.

The control system 300 may be provided with an optical tracking application 705 that configures the control system 300 to communicate with one or more optical motion capture systems 160. The optical tracking application 705 may configure the control system 300 to perform an initialization of the one or more optical motion capture systems 160 connected to the control system 300 (710). Following initialization of the control system 300 and/or the one or more optical motion capture systems 160, the control system 300 may begin processing raw data, such as optical image data, received from the one or more optical motion capture systems 160 (715). The raw data may include optical images of a swarm of one or more luminous flying vehicles 200.

In response to the receiving to the raw data, the control system 300 may generate point clouds that represent the positions of one or more luminous vehicles 200 of a swarm (715). For example, the control system 300 may be configured to generate one or more sets of 3-dimensional points corresponding to 3-dimensional locations of the one or more luminous flying vehicles 200. The points may correspond to the location of transmission of optical identification elements 231 of each of the luminous flying vehicles 200 of the swarm. The control system 300 may be further configured to transmit the one or more sets of 3-dimensional points to one or more other control systems connected to the control system 300 (720). For example, the control system 300 may be configured to transmit the one or more sets of 3-dimensional points to one or more other control systems connected to the control system 300 via a wired or wireless network.

The control system 300 and/or another control system may be provided with a vehicle control application 725, which may be executed in parallel with the optical tracking application 705. The vehicle control application 725 may configure the control system 300 and/or other control system to compute positions, movements, image commands and/or other control signals that may be transmitted to the one or more luminous flying vehicles 200 of the swarm.

In a semi-manual initialization configuration, the control system 300 may require that each of the points of a point cloud be mapped with a luminous flying vehicle 200 of the swarm (730). For example, a user of the control system 300 may map points of a point cloud with the luminous flying vehicles 200 of the swami (735). However, in other embodiments the initial mapping of points of the point cloud may be fully automated by the control system 300.

The control system 300 may be further configured to estimate the positions of the luminous flying vehicles 200 of the swarm based on the one or more sets of 3-dimensional points (745). The estimation of the positions of the luminous flying vehicles 200 may be further based on previous sets of 3-dimensional points and/or dynamic models describing the behavior of the luminous flying vehicles 200.

The control system 300 may be configured to continuously estimate the positions of the luminous flying vehicles 200 of the swarm at a rate less then or equal to a rate of the generation of the sets of 3-dimensional points. The control system 300 maybe further configured to generate vehicle trajectory and color command signals based on the estimated positions of the luminous flying vehicles 200 of the swarm (755). In some embodiments, the vehicle trajectory and color command signals are generated at a fixed frequency, which may be controlled according to a fixed control period (750). Following the generation of the vehicle trajectory and color command signals, the control system 300 may be configured to transmit the vehicle trajectory and color command signals to the luminous flying vehicles 200 of the swarm (760). In this manner, the luminous flying vehicles 200 can be configured and/or controlled to execute synchronized motions in space to form 2-dimensional and 3-dimensional luminous display surfaces or canvases comprising a plurality of pixels.

Figure 7B:
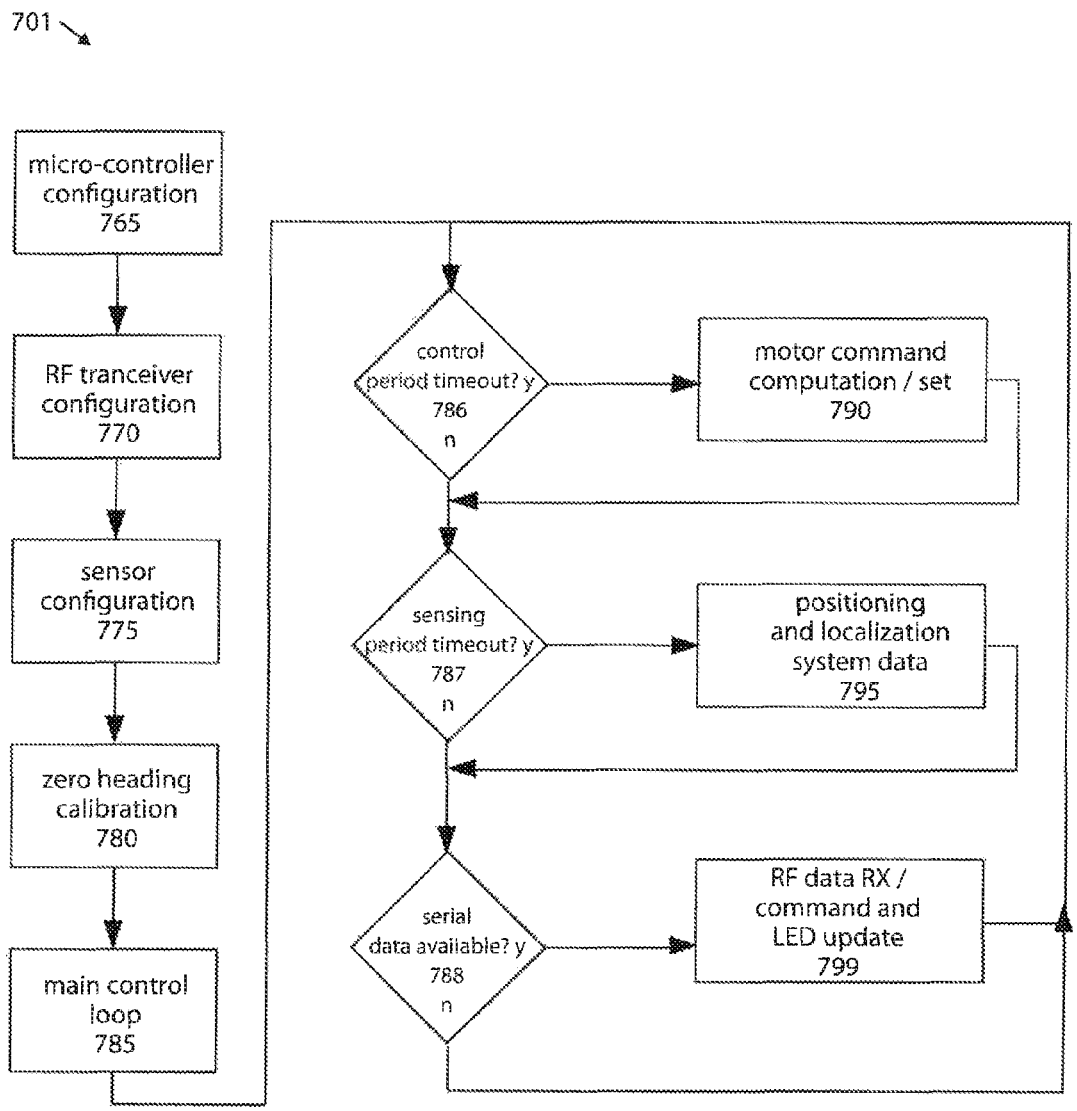

FIG. 7B is a flow diagram of a method 701 of controlling a 3-dimensional pixel array system, in accordance with embodiments of the present inventive concepts. Luminous flying vehicles 200 of a swarm may be configured according to a decentralized localization scheme, for example, as described above with reference to FIGS. 3B and 4B.

The luminous flying vehicles 200 of a swarm may be configured to commence an initialization procedure upon power-up (765). For example, a basic initialization and configuration of the micro-controllers 341 of the luminous flying vehicles 200 of the swarm may be performed. In addition, other devices of the luminous flying vehicles 200, such as wireless transceivers 244 (770) and/or positioning and localization systems 243 may be initialized during the initialization procedure (775).

The luminous flying vehicles 200 of the swarm may further be configured to undergo a zero heading calibration routine, which may define a default or zero heading orientation of each of the luminous flying vehicles 200 of the swarm (780). For example, each of the luminous flying vehicles 200 of the swarm may be positioned in an orientation that is to be defined as the default or zero heading orientation while positioning and localization systems 243 of each of the luminous flying vehicles 200 calibrate.

Following initialization and calibration routines, the luminous flying vehicles 200 of the swarm may be configured to commence performance of a luminous flying sequence or event (785). During performance of a luminous flying sequence or event, the luminous flying vehicles 200 may be configured to access data from the positioning and localization systems 243 (795) and/or generate control commands (790) at a predetermined, fixed frequency (786, 787).

The luminous flying vehicles 200 of the swarm may further be configured to transmit and receive data from other luminous flying vehicles 200 of the swarm and/or a control system 300 (799). The luminous flying vehicles 200 of the swarm may further be configured to update the color and intensity of the one or more luminous elements 230 of each of the luminous flying vehicles 200 of the swarm.

Accordingly, the luminous flying vehicles 200 of the swarm can be configured and/or controlled to execute synchronized motions in space to form 2-dimensional and 3-dimensional luminous display surfaces or canvases comprising a plurality of pixels.

Figure 8A:
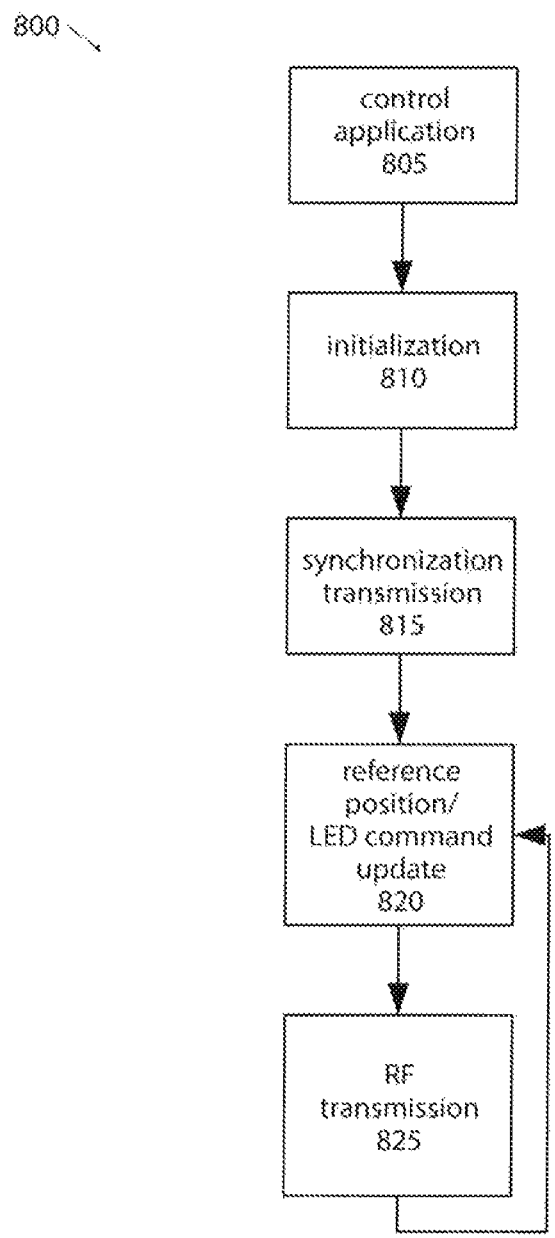

FIG. 8A is a flow diagram of a method 800 of controlling a 3-dimensional pixel array system, in accordance with embodiments of the present inventive concepts. A control system 300 may be configured according to a hybrid localization scheme, for example, as described above with reference to FIG. 3C.

The control system 300 may be provided with a control application 805 that configures the control system 300 to communicate with one or more optical motion capture systems 160 and/or one or more luminous flying vehicles 200 of a swarm.

The control system 300 may be configured to perform an initialization of the one or more optical motion capture systems 160 connected to the control system 300 and/or the one or more I/O devices 310 (e.g., wireless transceivers) of the control system 300 (810). Following initialization, a synchronization of the luminous flying vehicles 200 of the swarm may be performed (815). For example, the control system 300 may be configured to transmit a synchronization packet to the luminous flying vehicles 200 of the swarm.

The control system 300 may be configured to continuously transmit trajectory and color data to the luminous flying vehicles 200 of the swarm (820, 825). However, in some embodiments the trajectory and color data may be transmitted to and stored on board the luminous flying vehicles 200 of the swarm prior to commencing a performance or event.

Figure 8B:
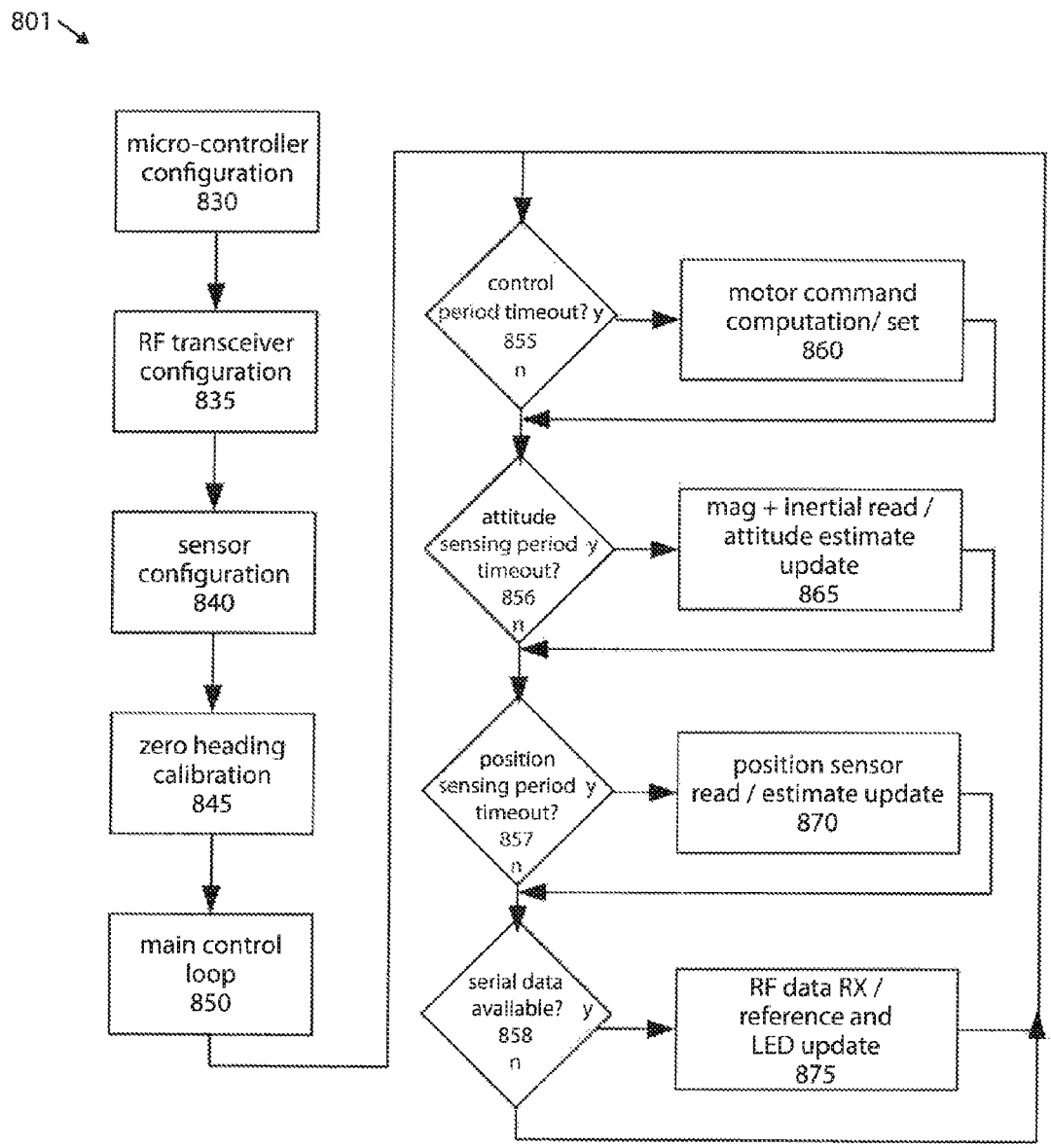

FIG. 8B is a flow diagram of a method of controlling a 3-dimensional pixel array system, in accordance with embodiments of the present inventive concepts. A luminous flying vehicle 200 may be configured according to a hybrid localization scheme, as described above with reference to FIG. 3C.

The luminous flying vehicle 200 of the swarm may be configured to commence an initialization procedure upon power-up (830). For example, a basic initialization and configuration of the micro-controllers 341 of the luminous flying vehicles 200 of the swarm may be performed. In addition, other devices of the luminous flying vehicles 200, such as wireless transceivers 244 (835) and/or positioning and localization systems 243 may be initialized during the initialization procedure (840).

The luminous flying vehicles 200 of the swarm may further be configured to undergo a zero heading calibration routine, which may define a default or zero heading orientation of each of the luminous flying vehicles 200 of the swarm (845). For example, each of the luminous flying vehicles 200 of the swarm may be positioned in an orientation that is to be defined as the default or zero heading orientation while positioning and localization systems 243 of each of the luminous flying vehicles 200 calibrate.

Following initialization and calibration routines, the luminous flying vehicles 200 of the swarm may be configured to commence performance of a luminous flying sequence or event (850). During performance of a luminous flying sequence or event, the luminous flying vehicles 200 may be configured to access data from the positioning and localization systems 243 (865, 870) and/or generate control commands (860) at a predetermined, fixed frequency (855, 856, 857).

The luminous flying vehicles 200 of the swarm may further be configured to transmit and receive data from other luminous flying vehicles 200 of the swarm and/or a control system 300 (875). The luminous flying vehicles 200 of the swarm may further be configured to update the color and intensity of the one or more luminous elements 230 of each of the luminous flying vehicles 200 of the swarm.

Figure 9A:
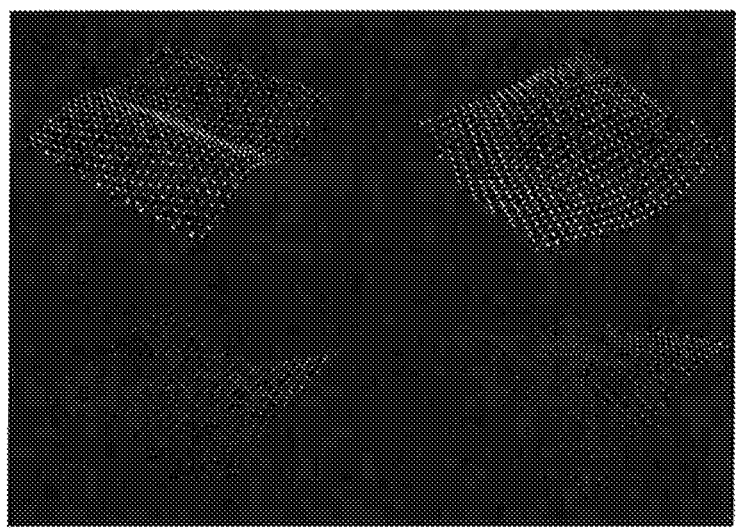
FIGS. 9A-9C illustrate 3-dimensional luminous pixel arrays in accordance with embodiments of the present inventive concepts.
Figure 9B:
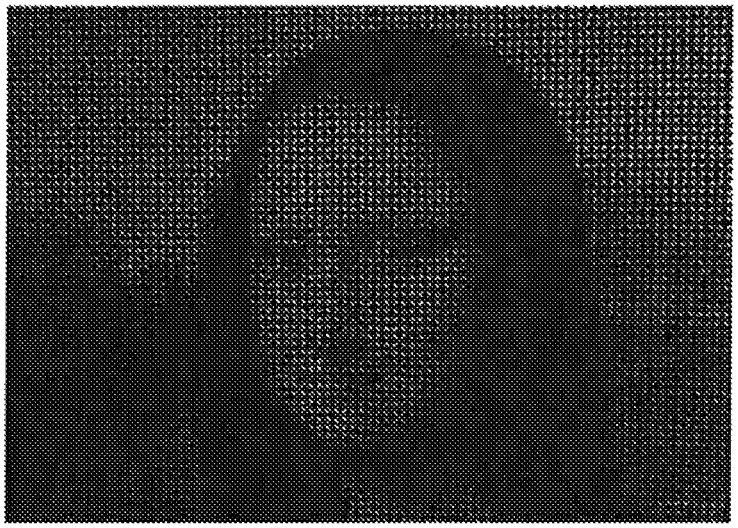
Figure 9C:
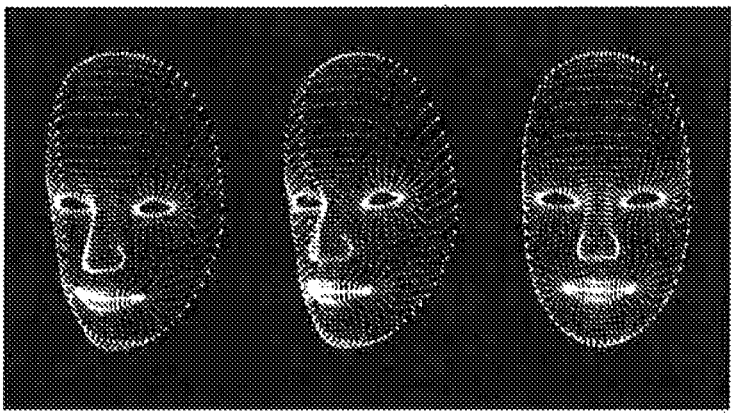

FIGS. 9A-9C illustrate 3-dimensional luminous pixel arrays in accordance with embodiments of the present inventive concepts. As described above, 3-dimensional luminous pixel arrays and 3-dimensional luminous pixel array systems can be configured and/or controlled to create and render 2-dimensional and 3-dimensional images and shapes that can move in space.

FIG. 9A illustrates a swami of luminous flying vehicles arranged in space. In this exemplary illustration, the swarm of luminous flying vehicles is arranged in space such that a free-form display is shown.

FIG. 9B illustrates a swarm of luminous flying vehicles arranged in space. In this exemplary illustration, the swarm of luminous flying vehicles is arranged in space such that a raster image is shown.

FIG. 9C illustrates a swarm of luminous flying vehicles arranged in space. In this exemplary illustration, the swarm of luminous flying vehicles is arranged in space such that a vector display is shown.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A luminous pixel array comprising:
a plurality of luminous flying vehicles, the flying vehicles being heavier-than-air flying machines that use lift generated by wings, configured to move in 3-dimensional space to execute synchronized motions under control of a control system including a micro-processing system configured to alter flight trajectory of first luminous flying vehicle in response to a pre-determined flight trajectory stored in memory of the micro-processing system wherein the first luminous flying vehicle of the plurality of luminous flying vehicles corresponds to at least one pixel of the luminous pixel array, and
wherein the first luminous flying vehicle is configured to radiate a first color and intensity of light wherein the plurality of luminous flying vehicles are further configured to move in three-dimensional space so as to create two-dimensional and three-dimensional shapes that can move in space.

2. The luminous pixel array of claim 1, wherein each one of the plurality of luminous flying vehicles corresponds to a pixel of the luminous pixel array.

3. The luminous pixel array of claim 1, wherein the first luminous flying vehicle comprises at least one luminous element constructed and arranged to radiate the first color and intensity of light.

4. The luminous pixel array of claim 3, wherein the at least one luminous element comprises an RGB light emitting diode.

5. The luminous pixel array of claim 1, wherein a second luminous flying vehicle of the plurality of luminous flying vehicles corresponds to at least one other pixel of the luminous pixel array.

6. The luminous pixel array of claim 5, wherein the second luminous flying vehicle comprises at least one luminous element constructed and arranged to radiate a second color and intensity of light.

7. The luminous pixel array of claim 6, wherein the at least one luminous element comprises at least one light emitting diode.

8. The luminous pixel array of claim 1, wherein the plurality of luminous flying vehicles are further configured to move in 3-dimensional space so as to create 2-dimensional and 3-dimensional shapes that can move in space.

9. The luminous pixel array of claim 8, wherein a color and intensity of light is radiated by each of the plurality of luminous flying vehicles so as to render 2-dimensional and 3-dimensional images.

10. A luminous pixel array system comprising:
at least one luminous flying vehicle being heavier-than-air flying machine that uses lift generated by wings, the at least one luminous flying vehicle corresponding to at least one pixel of a luminous pixel array; and
a control system configured to wirelessly communicate with the at least one luminous flying vehicle wherein the at least one luminous flying vehicle is configured to execute synchronized motions under control of a control system including a micro-processing system configured to alter flight trajectory of the first luminous flying vehicle in response to a predetermined flight trajectory stored in memory of the micro-processing system to move in a 3-dimensional space so as to create 2-dimensional and 3-dimensional shapes that can move in space.

11. The luminous pixel array system of claim 10 further comprising an optical motion capture system configured to transmit captured images of the at least one luminous flying vehicle to the control system.

12. The luminous pixel array system of claim 11, wherein the control system is further configured to reconstruct the spatial position of the at least one luminous flying vehicle based on the captured images.

13. The luminous pixel array system of claim 12, wherein the control system is further configured to compute control commands based on a predetermined image-creating event stored in memory of the control system.

14. The luminous pixel array system of claim 13, wherein the control commands are transmitted by the control system to the at least one luminous flying vehicle, and wherein a vehicle control system of the luminous flying vehicle alters at least one of a flight trajectory and a luminous element color and intensity according to the control commands received from the control system.

15. The luminous pixel array system of claim 13, wherein the predetermined image creating event comprises at least one of flight trajectory data and image/sequence data.

16. The luminous pixel array system of claim 15, wherein the flight trajectory data comprise a plurality of desired spatial positions for the at least one luminous flying vehicle as a function of time.

17. The luminous pixel array system of claim 15, wherein the flight trajectory data comprises a mathematical function describing a geometry of a flight trajectory of the at least one luminous flying vehicle as a function of time.

18. The luminous pixel array system of claim 15, wherein the image/sequence data comprises a plurality of luminous element color and intensity values for the at least one luminous flying vehicle as a function of time.

19. The luminous pixel array system of claim 13, wherein the control system is further configured to transmit the control commands to the at least one luminous flying vehicle.

20. The luminous pixel array system of claim 19, wherein the at least one luminous flying vehicle executes synchronized motions in space corresponding to control commands received from the control system.

* * * * *